June 6, 1950 K. A. KAIL 2,510,578
AVIATION TRAINER
Filed May 28, 1946 7 Sheets-Sheet 1

KARL A. KAIL
INVENTOR.
BY
ATTORNEYS

June 6, 1950 K. A. KAIL 2,510,578
AVIATION TRAINER
Filed May 28, 1946 7 Sheets-Sheet 2

KARL A. KAIL
INVENTOR

BY
ATTORNEY

June 6, 1950

K. A. KAIL 2,510,578

AVIATION TRAINER

Filed May 28, 1946

KARL A. KAIL
INVENTOR

BY
ATTORNEY

June 6, 1950  K. A. KAIL  2,510,578
AVIATION TRAINER
Filed May 28, 1946  7 Sheets-Sheet 4
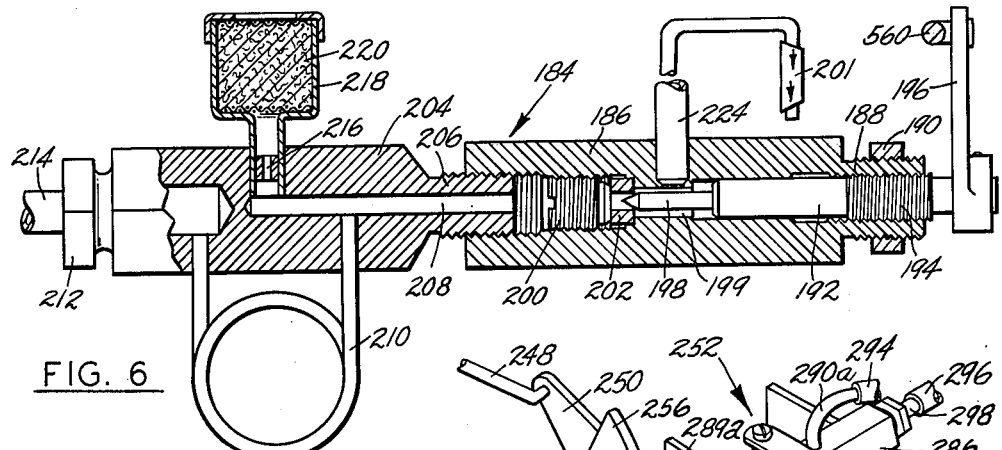
FIG. 6
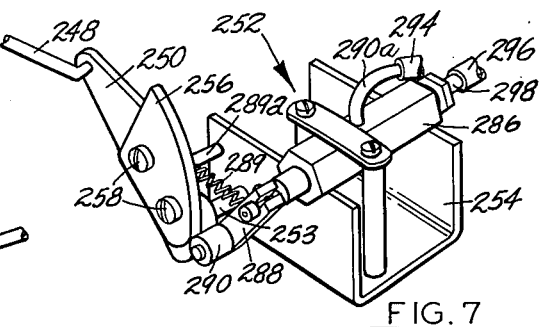
FIG. 7
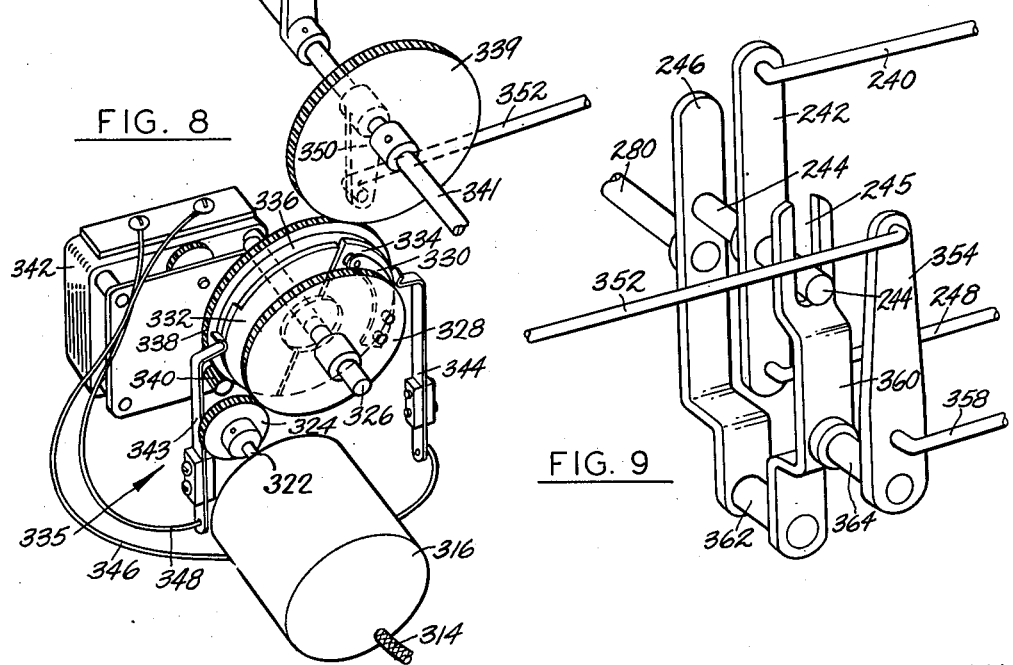
FIG. 8
FIG. 9
KARL A. KAIL
INVENTOR
BY
ATTORNEY June 6, 1950      K. A. KAIL      2,510,578
AVIATION TRAINER
Filed May 28, 1946      7 Sheets-Sheet 5
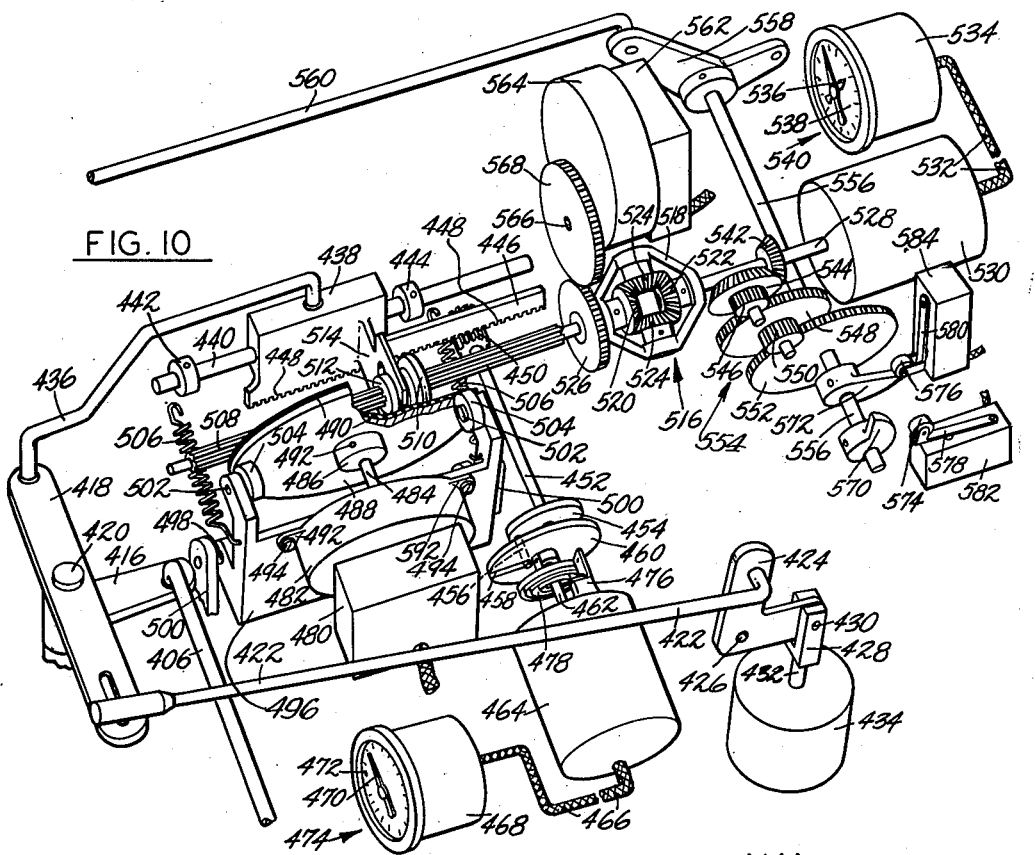
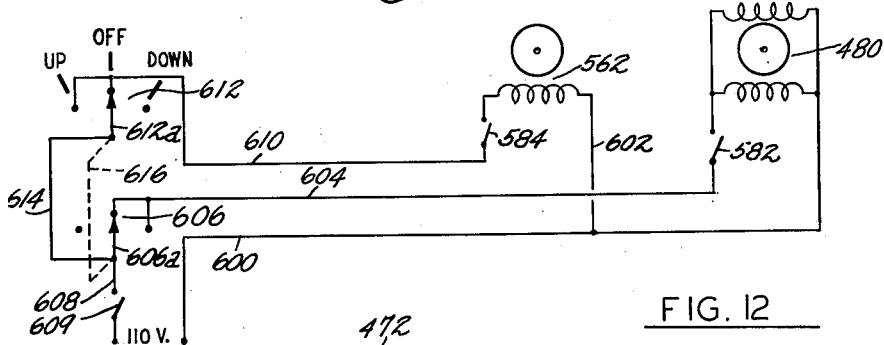
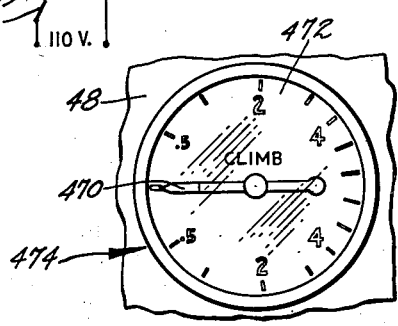
KARL A. KAIL
INVENTOR
BY
ATTORNEY June 6, 1950 K. A. KAIL 2,510,578
AVIATION TRAINER
Filed May 28, 1946 7 Sheets-Sheet 6

KARL A. KAIL
INVENTOR
BY
ATTORNEY

June 6, 1950 K. A. KAIL 2,510,578
AVIATION TRAINER
Filed May 28, 1946 7 Sheets-Sheet 7

KARL A. KAIL
INVENTOR
BY
ATTORNEY

Patented June 6, 1950

2,510,578

UNITED STATES PATENT OFFICE 2,510,578

AVIATION TRAINER

Karl A. Kail, Montrose, Pa., assignor to Link Aviation, Inc., Binghamton, N. Y., a corporation of New York Application May 28, 1946, Serial No. 672,875

4 Claims. (Cl. 35—12)

This invention relates to improvements in grounded aviation trainers, and more particularly in altitude systems therefor, which systems are employed to cause the altimeter and vertical speed indicator in the trainer to operate in a manner closely simulating the operation of the altimeter and vertical speed indicator of a real plane in actual flight.

Trainers of the type with which my invention may be used are disclosed in U. S. Patents 1,825,462 and 2,099,857 issued to Edwin A. Link, and the improvements of this application will be disclosed in connection with improvements covered by my application Serial Number 619,361 filed September 29, 1945 for Aviation trainer, which application also discloses trainers of the type covered by the same U. S. patents. This application has matured into Patent No. 2,485,292, dated Oct. 18, 1949. Such trainers are known by those skilled in the art to include a fuselage rotatably mounted with respect to a stationary base by means of a main spindle, the fuselage also being universally mounted upon the top of the spindle. Within the trainer is provided a pair of rudder pedals and a control wheel or stick, and the manual controls within the trainer are connected to suitable vacuum-operated apparatus so that the fuselage turns, dives, and banks in response to the movements of the manual controls in the same manner that a plane in actual flight turns, dives, and banks in response to movements of the corresponding controls in the plane.

Also in trainers of the type being considered, there are provided instruments which simulate the instruments of a real plane, these instruments including an airspeed indicator, an altimeter and a vertical speed indicator. Also within the fuselage is a lever which simulates the throttle control lever of a real plane. Upon a manipulation of the throttle control simulating lever in the trainer, the airspeed indicator, altimeter and vertical speed indicator respond generally in the same manner that the real instruments in a plane in actual flight would respond to a corresponding movement of the throttle control lever in the plane. Also, these three instruments respond to a change in the diving or climbing attitude of the fuselage (hereinafter referred to as pitch) in the same manner that the instruments in a real plane would respond to corresponding changes in the attitude of the plane.

Insofar as the altitude systems in the prior art trainers responsive to the movement of the throttle lever and changes in pitch attitude of the trainer are concerned, these systems have conventionally included a vacuum system comprising a tank connected through a pair of valves known as the climb-dive valves to a source of reduced pressure and to the atmosphere. The climb-dive valves have been operated in response to movements of the lever and to changes in the pitch attitude of the fuselage in order that the pressure within the altitude tank would be selectively varied. An altimeter and a vertical speed indicator have been connected to the tank, and responsive to the pressure therewithin, so that they indicate the assumed altitude and assumed vertical speed of the trainer. Such well known vacuum-operated altitude systems have had several defects long known to the prior art which my invention aims to correct. For example, in transferring the changes in pressure within the tank to the altimeter and vertical speed indicator, it has been necessary to use a diaphragm which would expand or contract in response to such changes in pressure. The disphragm in turn has been connected to certain mechanical linkage which in turn operates a selsyn-type transmitting system which actuates the instruments in question. Upon a change in pressure within the tank, and especially in the case where the direction of change in pressure within the tank is reversed, a definite dead-spot in the diaphragm and in the linkage is present. Accordingly, there is lost motion and the instruments have also reflected this dead spot, thereby giving faulty indications.

Also in the case of the climb-dive valves it has been found impossible to adjust these valves near the zero vertical speed position in order that slight movements of the throttle lever or changes in attitude of the plane would result in changes in instrument indication.

Also, in previously known trainers the limitations of the altitude systems have rendered it difficult to achieve high assumed altitudes.

Another important disadvantage of the previously used vacuum operated altimeter and vertical speed systems was that it was necessary to calibrate each altimeter and vertical speed indicator used in the trainers over the entire range of instrument indication because of the impossibility of manufacturing diaphragms which would all respond exactly the same amount to any given change in pressure within the tank at any level of pressure within the tank. (The same is also true of all aircraft altimeters and vertical speed indicators, which, as is well known, are diaphragm operated.)

Also, in previously known trainers the instruments of the trainer have not been directly nor realistically affected by the rough air means in the trainer.

It is, therefore, a general object of my invention to provide a new altitude system for use in grounded aviation trainers, which system will eliminate the previously described disadvantages.

It is a more particular object of my invention to provide an altitude system whereby a sensitive zero may be obtained and whereby changes in the assumed direction of vertical movement of the trainer will not produce dead spots in the functioning of the apparatus.

It is another important advantage of my invention to provide an altitude system wherein it will not be necessary to calibrate all of the altimeters and vertical speed indicators throughout their entire range.

It is still another object of my invention to provide means whereby the indications of the vertical speed indicator and altimeter will be affected by simulated rough air means, in the same manner that the corresponding instruments of a real plane are affected by rough air conditions.

Another object of my invention is to provide means whereby an unlimited high assumed altitude may be obtained.

Other important objects of my invention will be made more clear as the description proceeds.

In order that the preferred disclosed embodiment of my invention may be clearly understood, reference is made to the accompanying drawings wherein, Fig. 1 is a general perspective view of trainers of the type disclosed in the above mentioned U. S. patents, and showing the general location of the important parts of my invention.

Fig. 6 is a cross-sectional view of one of the control valves which may be used in conjunction with my invention.

Fig. 7 is a perspective view of the air speed control valve.

Fig. 8 is a perspective view of the air speed power amplifier.

Fig. 9 is a detailed perspective view of one of the leverage systems which may be incorporated in trainers of the type being considered.

Fig. 10 is a perspective view of the altitude unit of this invention.

Fig. 11 is a front view of a typical vertical speed indicator.

Fig. 12 is a wiring diagram of the motors shown in Fig. 10.

Figure 1:
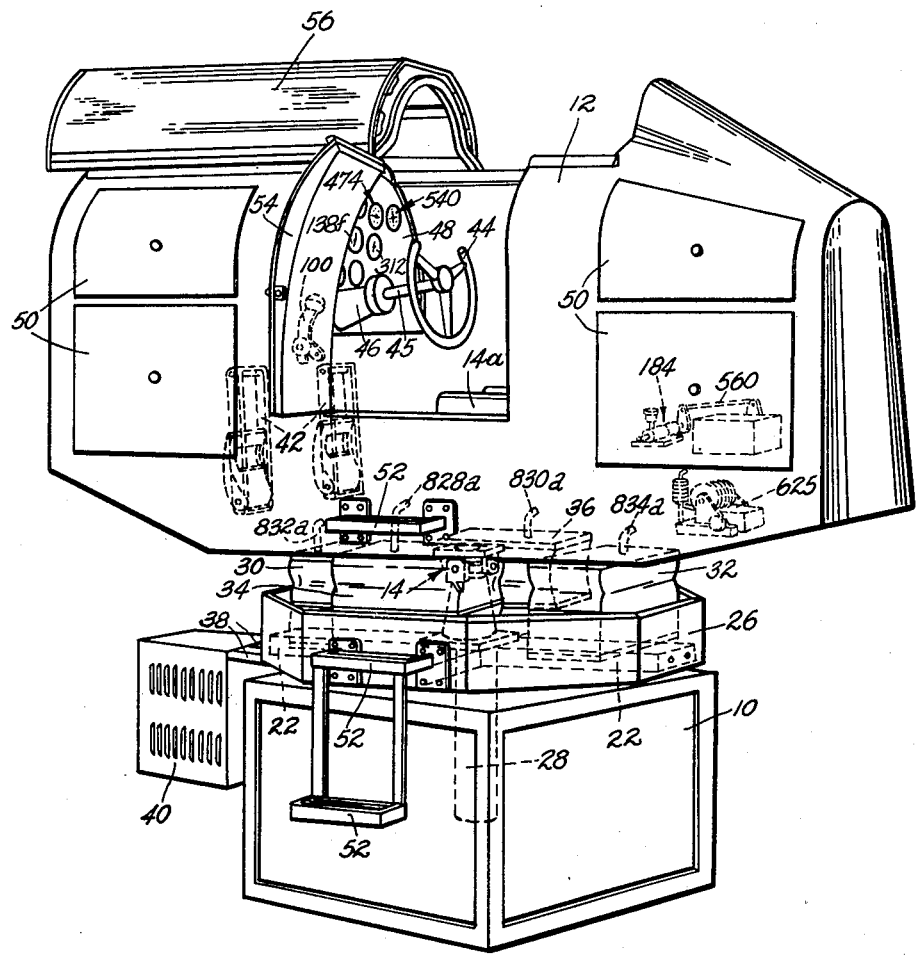
Figure 2:
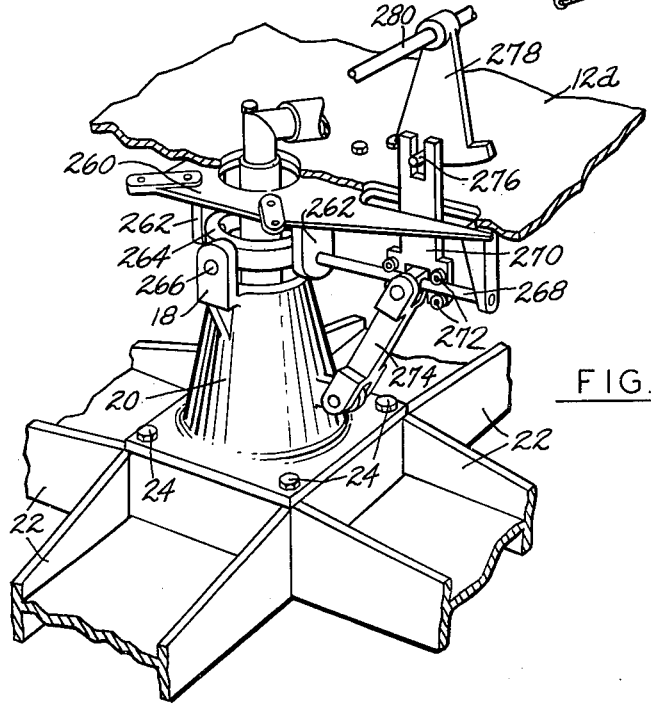
Fig. 2 is a perspective view showing the previously mentioned universal joint, and the pitch action take-off apparatus of such trainers.

Referring now to Fig. 1, it will be seen that the illustrative training device includes a base 10 which rests upon the floor of the room in which the training device is housed. The fuselage 12 is positioned above the base, and in the fuselage is a seat 14a for the student. Referring also to Fig. 2, it will be seen that the bottom of the fuselage is designated 12a, and rests upon the supporting plate 260 to which it is suitably attached, as by bolts. Plate 260 is integral with the upper member 262 of the universal joint which is designated generally 14. The gimbal ring of the universal joint is numbered 264, and this universal joint is supported by the ears 18 (only one shown) which are integral with the pedestal 20. Pedestal 20 is bolted to the cross-arms 22 by bolts 24, and these cross-arms are affixed to the octagon 26. The cross-arms 22, pedestal 20 and all elements supported thereby are mounted upon the top of the main spindle 28 which is suitably rotatably mounted with respect to the stationary base 10. The universal joint 14 is arranged so that the fuselage 12 may pitch about a transverse axis coincident with the axes of the pins 266, as well as about an axis perpendicular to this first axis. Four collapsible-expansible bellows 30, 32, 34 and 36 are provided, these bellows being, respectively, the front and rear pitching bellows and the left and right banking bellows. The upper end of each of these bellows is suitably affixed to the bottom 12a of fuselage 12, while the bottom end of each of these bellows is suitably affixed to a different one of the cross-arms 22.

The two supporting members 38 are suitably carried by the forward cross-arm 22, and these supporting members in turn carry the conventional turning motor 40. Within fuselage 12 are placed a pair of rudder pedals 42 ahead of the seat 14a, as well as a control wheel 44 which is supported by shaft 45 which in turn is rotatably and slidably supported by the pedestal 46 positioned in front of the instrument panel 48. As is well known to those skilled in the art, and also as disclosed in the above mentioned patents and application, the rudder pedals 42 control the turning motor 40 which in turn rotates the fuselage 12, all of the apparatus shown in Fig. 2, as well as the bellows, octagon, and the turning motor itself, to the right or left depending on which rudder pedal is pressed forward. In this manner, the student may cause the fuselage 12 to rotate in simulation of the turning of a plane in actual flight. The turn indicating instruments conventionally placed upon the instrument panel 48 respond accordingly. Upon a rotation of the control wheel 44 counterclockwise, the left banking bellows 34 is collapsed and the right banking bellows 36 is expanded, resulting in a banking of fuselage 12 to the left. An opposite rotation of control wheel 40 results in a collapsing of bellows 36 and an expansion of bellows 34, and fuselage 12 banks to the right. At the same time, a pushing ahead of the control wheel 44 causes bellows 30 to collapse and bellows 32 to expand, so that fuselage 12 assumes a nose-down position. On the other hand, a pulling to the rear of control wheel 44 results in a collapsing of bellows 32 and an expansion of bellows 30, and fuselage 12 assumes a more nose-up position. Accordingly, the fuselage 12 may be turned, banked, and dived and climbed in the same manner that a plane in actual flight is controlled by the pilot. All of the instruments upon panel 48 respond properly to any given movement of fuselage 12 or to any combination of such movements.

A plurality of inspection ports 50 are carried by the side of fuselage 12 in order that they may be removed for inspection of the apparatus contained therein.

Steps 52 are provided for easy access and egress to and from fuselage 12, and door 54 may be closed and opened as the occasion requires. A slidable hood 56 is mounted upon the top of fuselage 12, and this hood may be moved to the rear of the position shown in Fig. 1 to completely enclose the student in fuselage 12 in order that instrument flying conditions may be accurately imitated.

In order that the use of the apparatus of this invention may be completely understood and illustrated in connection with the apparatus disclosed in the above mentioned patents and application, the following sequence of presentation will be adopted:

1. Throttle control lever setting and altitude will be combined to produce the factor of assumed engine power output or assumed manifold pressure, which for the purposes of this application, may be considered to be equivalents.

2. Engine power output will be combined with the factor of fuselage attitude to produce the factor of assumed air speed.

3. Assumed air speed will be combined with the factor of fuselage attitude to produce the factor of assumed vertical speed.

4. Assumed vertical speed will be integrated with respect to time in order to produce the factor of assumed altitude.

Then, the effect of the rough air mechanism which may be incorporated in trainers of the type being considered will be combined with my improved apparatus in order to further simulate accurate flying conditions.

*Means for producing the factor of assumed engine power output*

Figure 3:
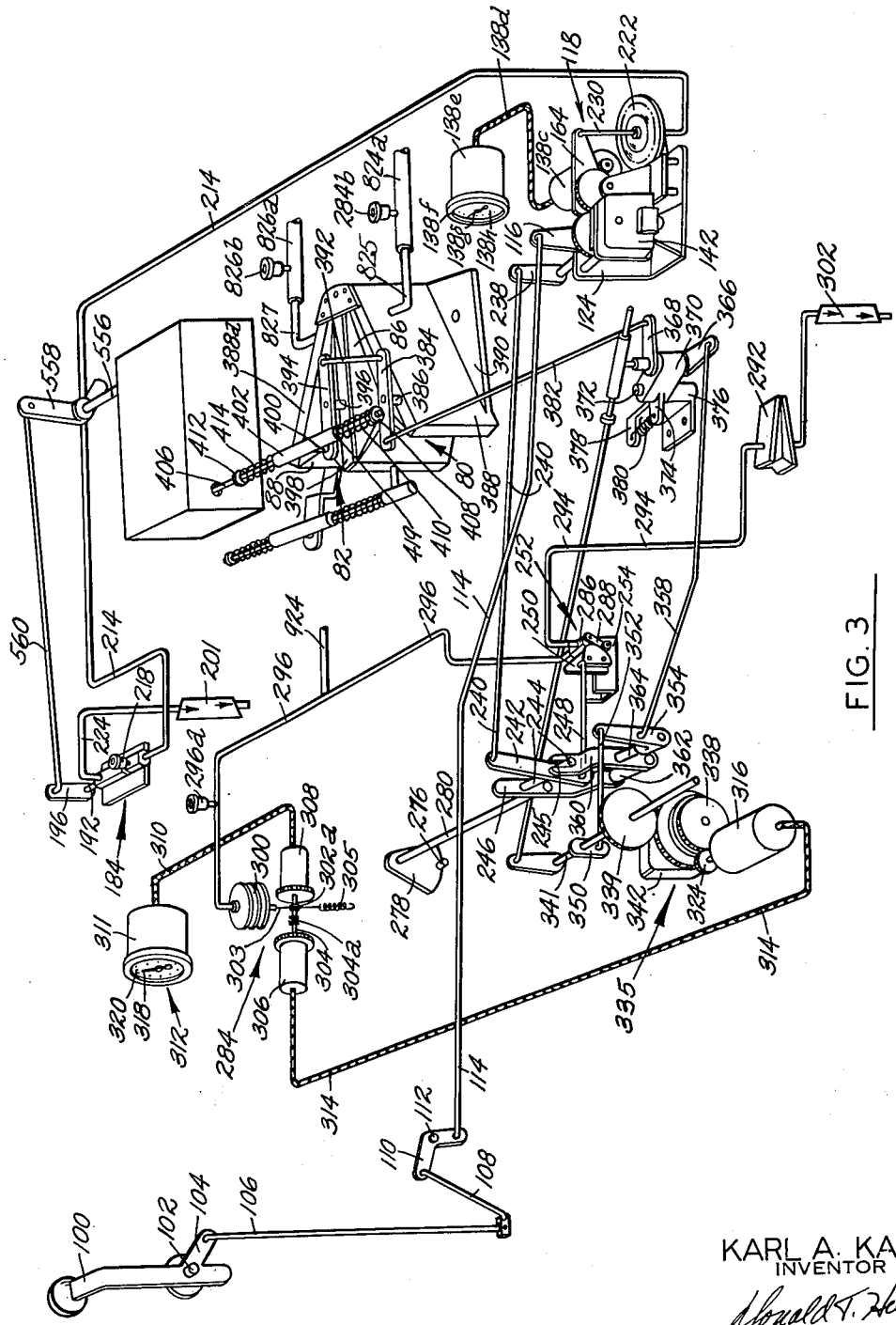
Fig. 3 is a general perspective view showing the general relationship of certain of the control systems in such trainers, as disclosed in Patent Number 2,485,292, and how my invention may be associated therewith in order to form a completely operable apparatus.

Reference is now made to Fig. 3 where the throttle lever is designated 100. Lever 100 is pivotally mounted upon the rod 102 which is affixed inside the fuselage 12 in a proper position relative to the seat 14a. Integral with the throttle lever 100 is the arm 104 to which is pivotally attached the upper end of vertical link 106.

Pivotally attached to the lower end of link 106 is the link 108, the other end of which is also pivotally attached to the fore end of bell crank 110 which is pivotally mounted upon the rod 112 affixed within the interior left side of fuselage 12. To the lower end of bell crank 110 is pivotally attached the forward end of link 114. It will be seen that the rear end of link 114 is pivotally attached to the upper end of arm 116 which is a part of the engine power or manifold pressure engine unit designated generally by 118.

Figure 4:
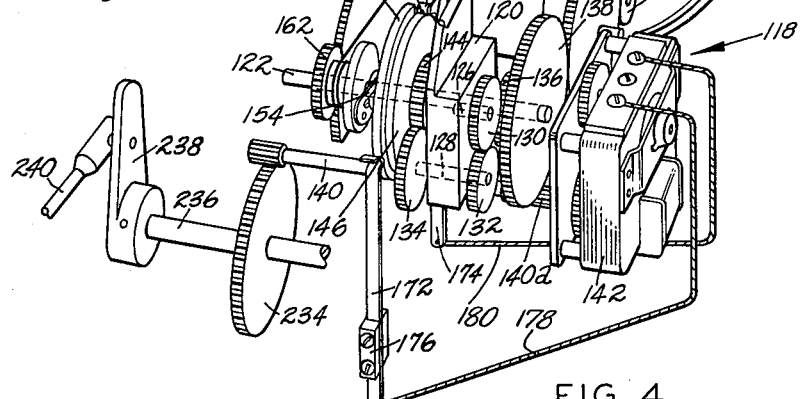
Fig. 4 is a perspective view of the engine power amplifier which may be used in conjunction with my invention.

Reference is now made to Fig. 4 which is a detailed disclosure of the construction of the manifold pressure engine unit designated generally by 118. In Fig. 4 the rear end of the link 114 which is moved by the throttle lever is shown, as is the arm 116. It will be seen that the block 120 is integral with the arm 116 and that block 120 is rotatably mounted upon rod 122 which is fixedly held in the frame 124. Frame 124 is rigidly attached to the bottom 12a of the fuselage 12. Two shafts 126 and 128 are rotatably mounted in the block 120. Upon the outer end of the shaft 126 is mounted the spur gear 130 while upon the outer ends of the shaft 128 are mounted the spur gears 132 and 134. Meshing with gear 130 is the spur gear 136 which is affixed to the large spur gear 138 which is rotatably mounted upon shaft 122. Gear 138 is driven by the shaft 140 splined at 140a and which in turn is driven by motor 142.

A suitable reduction gear train may be interposed between the motor 142 and the spline 140a.

Still referring to Fig. 4, rotatably mounted upon the fixed rod 122 and driven by gear 134 is the spur gear 144 which is affixed to the insulating ring 146 to rotate the same. Affixed to the insulating ring 146 are the two split contact segments 148 and 150. Considering now Fig. 5 in conjunction with Fig. 4, it will be seen that the insulating disc 146 carries the split contact segments 148 and 150 by means of rivets 151. Rotatably mounted upon the fixed rod 122 is the drum 152 carrying the contact 154. A string 156 has its forward end wound around the drum 152 and attached thereto, while the rear end of this string is attached to the spring 158 which has its rear end attached to the arm 160, which in turn is attached to the gear sector 164.

Integral with the drum 152 is the gear 162 which is positioned by the gear sector 164. The gear sector 164 is pivotally mounted upon the circular block 166 integral with the rod 168 which is affixed in frame 124. Spring 158 and string 156 bias drum 152 to remove the backlash between gear 162 and sector 164. A second spring 167 is affixed to the fixed member 160 as shown, and affixed to the spring is the string 169 which winds around and is anchored to the drum 170 which is affixed to the contact segments 148 and 150. This spring and string arrangement biases the segments 148 and 150 to remove the backlash between these segments and motor 142.

Figure 5:
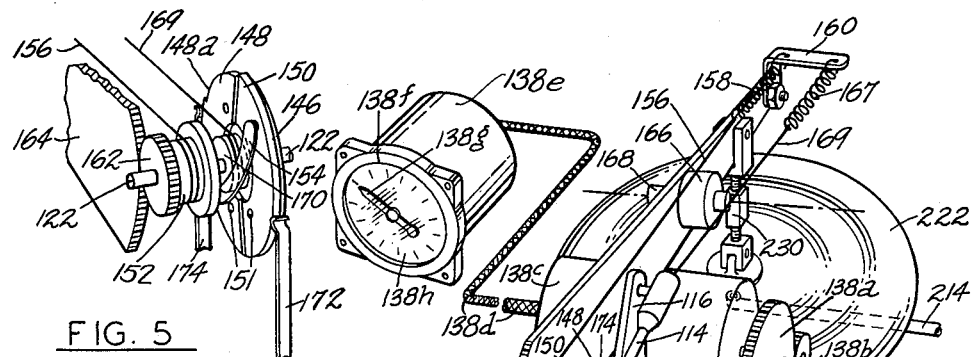
Fig. 5 is a detailed perspective view of a portion of the apparatus shown in Fig. 4.

A pair of contacts 172 and 174 are carried by the insulating members 176 in turn held by frame 124 so as to engage the contact segments 148 and 150 as better seen in Fig. 5. Each of the contacts 172 and 174 is connected to motor 142 by one of the conductors 178 and 180, and the contact 154 is grounded. Motor 142 is of the type that when contact 154 is in engagement with both of the contact segments 148 and 150 the motor is deenergized. When the contact 142 engages only the contact segment 148, motor 142 is energized to turn in one direction, and when contact 154 engages only the other contact 150, motor 142 is energized to turn in the opposite direction.

Assuming that the contact 154 is engaging both of the contact segments 148 and 150, the motor 142 will be at rest. If the throttle lever 100 is then pushed ahead, i. e., that is to the left in Fig. 3, the link 106 moves upwardly with the movement of the throttle lever. The upward movement of link 106 results in a movement ahead of link 114, and referring to Fig. 4 the arm 116 and block 120 are rotated counterclockwise about the rod 122. Accordingly, gears 130, 132 and 134 and shafts 126 and 128 are likewise rotated counterclockwise about rod 122. Gear 136 remains stationary, and the coaction of gears 130 and 136 results in a rotation of the gear 130 upon the shaft 126, and consequently, the gears 132 and 134 are rotated resulting in a rotation of the gear 144 which is fixed to the insulating block 146. The rotation of gear 144 results in a counterclockwise rotation of the insulating block 146 and contact segments 148 and 150.

The counterclockwise rotation of the contact segments 148 and 150 will disengage the contact 154 from engagement with the contact segment 150 and the contact 154 will engage only segment 148. As a result motor 142 will be energized so that the shaft 140 rotates clockwise as seen from the left. The running of motor 142 will result in a rotation of the gears 138, 136, 130, 132, 134 and 144, and the rotation of gear 144 will rotate the insulating disc 146 and contact segments 148 and 150 clockwise. The motor 142 will continue to run until it has rotated the contact segments 148 and 150 through the same angle but in the opposite direction from which they were rotated as a result of the movement of the throttle lever and link 114. When the contact segments 148 and 150 have been rotated through this angle, the contact 154 will again engage both of the contact segments and motor 142 will stop. On the other hand, assuming that the contact 154 engages both of the contact segments 148 and 150, if the throttle lever 100 is moved to the rear, link 106 moves downwardly and link 114 moves toward the rear of the trainer. Arm 116 is rotated clockwise as is block 120 and the movement of block 120 carries with it the shafts 126 and 128 and the gears 130, 132 and 134. The coaction of gear 130 with gear 136 which remains stationary results in a rotation of gear 130 and the rotation of this gear is imparted to the gear 144. The rotation of gear 144 is in a clockwise direction and the contact segments 148 and 150 move therewith. Contact 154 will become disengaged from segment 148 but will remain in engagement with segment 150. The motor 142 is as a result energized and the splined shaft 140a is rotated in a counterclockwise direction. The running of motor 142 through the gears 138, 136, 130, 132, 134 and 144 results in a counterclockwise rotation of the split contact segments 148 and 150. The running of the motor continues until these two contact segments again are both in engagement with the contact 154. At this point motor 142 stops.

It will therefore be appreciated that the direction and magnitude of the output of motor 142 is dependent upon the setting of throttle lever 100 and consequently the angular position of shaft 140 with respect to a predetermined zero position is dependent upon the position of throttle lever 100. Accordingly, the angular position of shaft 140 with respect to an initial zero position may be taken as a measure of assumed engine power output or assumed manifold pressure, and this factor is responsive to changes in the setting of the throttle lever.

The second factor which is combined with throttle lever position to produce assumed engine power output (manifold pressure) is the factor of assumed altitude. As assumed altitude increases, assumed engine power decreases. In Fig. 3 the arm 196 is shown, and, as will be later more fully explained, this arm is always positioned in accordance with the factor of assumed altitude—the higher the assumed altitude the more counter-clockwise position arm 196 assumes. The arm 196 is affixed upon the right end of shaft 192 which controls the altitude valve designated generally by 184.

Referring now to Fig. 6, it will be seen that valve 184 comprises a main body portion 186 having integral therewith an extension 188 which is threaded in a tapered fashion upon its outside and is also interiorly threaded. Lock nut 190 is provided. The stem of the valve is designated 192 and integral with this stem are the threads 194 which coact with the threads within extension 188. The operating arm 196 is shown fixedly attached to the outer end of stem 192.

Integral with the stem 192 is the needle 198, tapered as shown. The plug 200 holds the seat 202 of the valve in place, plug 200 being hollow to permit the passage of vacuum therethrough, the chamber 199 in the valve being connected to the pump 201 through line 224. The capillary and bleed hole fitting assembly comprises a main body portion 204 having integral therewith the threaded extension 206 which fits inside the interiorly threaded left end of the main body portion 186. The body portion 204 is drilled at 208 to permit the passage of vacuum therethrough and the capillary 210 connects the drilled portion 208 with the exterior fitting 212 which is connected with the Sylphon bellows 222 of the manifold pressure engine unit 118 through the vacuum line 214, as seen in Fig. 3. Bleed hole 216 connects the capillary 210 at all times with the atmosphere through the cup 218 which is filled with a suitable straining material 220, such as cotton. Sylphon bellows 222 is airtight in construction and therefore by changing the pressure within this bellows it may be made to expand or contract.

Referring now to Figs. 3 and 6, it will be appreciated that atmosphere enters the Sylphon bellows 222 at all times by virtue of the bleed hole 216. In the absence of other controlling factors, therefore, the pressure within bellows 222 would at all times be equal to the atmospheric pressure. However it will be appreciated that the position of needle 198 relative to seat 202 depends upon the position of the operating arm 196 which in turn depends upon the factor of assumed altitude. When arm 196 is positioned so that the valve formed by needle 198 and seat 202 is closed, valve 184 has no effect upon the Sylphon bellows 222. The valve may be adjusted to be closed when assumed altitude is zero. However, as the factor of assumed altitude increases, the operating arm 196 is rotated counterclockwise as seen in Fig. 3, and referring to Fig. 6 it will be seen that the needle 198 will be removed from the seat 202 by an amount depending upon the increase in assumed altitude. Vacuum will therefore be admitted through the line 224, through the needle valve and capillary 210 and connection 214 to the Sylphon bellows 222. The Sylphon bellows 222 will therefore be contracted by an amount dependent upon the setting of the instant assumed altitude. On the other hand, should the Sylphon bellows 222 be previously contracted a given amount as the result of an assumed altitude of a given amount, and thereafter the factor of assumed altitude is decreased, the valve 184 will be proportionately closed, a decrease in the application of vacuum to the interior of Sylphon bellows 222 results, and an expansion of the bellows 222 occurs. It will therefore be appreciated that the expansion and contraction of the Sylphon bellows 222 may be used as a measure of changes in the assumed manifold pressure or assumed engine power output insofar as these factors are dependent upon assumed altitude.

Bearing in mind the earlier detailed construction of the engine unit shown in Fig. 4, it will be appreciated that whenever the bellows 222 is collapsed, as may occur with an increase in assumed altitude the link 230 which has its lower end pivotally attached to the top of bellows 222 will be moved downwardly and inasmuch as the upper end of this link is pivotally connected to the rear end of sector 164, the rear end of sector 164 will also move downwardly, sector 164 pivoting upon the boss 166 integral with the shaft 168 fixed in the frame 124 of the unit. The fore end of sector 164 will move upwardly, and drum 152 will be rotated counterclockwise and the contact 154 will be moved in the same direction and out of engagement with contact segment 148. Motor 142 will therefore be energized in such a direction that the output shaft 140 is rotated counterclockwise. The counterclockwise rotation of the output shaft 140 will result in a counterclockwise rotation of the contact segments 148, 150 and motor 142 will continue this rotation until both of the contact segments 148 and 150 are again engaged by the contact 154. At this instant motor 142 will stop. It will be appreciated that the angular rotation of the output shaft 140 will be dependent upon the extent of the collapsing of the Sylphon bellows 222 which is dependent upon the magnitude of the change in assumed altitude.

It should be noted that whenever the throttle lever 100 shown in Fig. 3 is moved to the rear, the output shaft 140 is rotated counterclockwise by motor 142, and that when the Sylphon bellows 222 is collapsed as a result of an increase in assumed altitude, the output shaft 140 also rotates counterclockwise. It will therefore be appreciated that the output shaft 140 is always rotated counterclockwise by the motor 142 in response to a positioning to the rear of the throttle lever 100 and/or by an increase in assumed altitude. Accordingly, the shaft 140 is rotated counterclockwise through an angle proportional to decreases in the assumed manifold pressure.

On the other hand, should the Sylphon bellows 222 be expanded as a result of a decrease in the assumed altitude of the trainer, it will be appreciated without a detailed explanation, that the contact segment 154 will be rotated clockwise and that the motor 142 will be energized to rotate the shaft 140 in a clockwise direction until the two contact segments 148 and 150 again both engage the contact 154. The angular rotation of shaft 140 in this direction will depend upon the amount of expansion of the bellows 222 which will depend upon the magnitude of the decrease in assumed altitude. It will be recalled that the output shaft 140 is also rotated clockwise in response to a forward movement of the throttle lever 100. Acordingly, the output shaft 140 is always rotated clockwise through an angle proportional to increases in the assumed manifold pressure, and the instant assumed manifold pressure may always be measured by the angular position of shaft 140 relative to a predetermined neutral position.

Parenthetically, at this point it should be noted that a notch 148a is placed in contact segment 148 seen in Fig. 5. In the operation of the unit in question the contact segments 148 and 150 are never rotated in response to a movement of the throttle lever so far as to move notch 148a opposite the contact 174. Notch 148a is therefore provided to limit the clockwise rotation of the contact segments when motor 142 is energized as a result of the clockwise rotation of contact 154 caused by an expansion of bellows 222. When contact 174 is opposite notch 148a, motor 142 will not run to rotate the contact segments further clockwise.

Still referring to Fig. 4, it will be seen that the gear 234 is arranged to be rotated by the shaft 140, gear 234 being fixedly mounted upon the shaft 236 which is rotatably mounted in the frame 124 of the unit 118. Upon the left end of shaft 236 is mounted the arm 238 to which is pivotally connected the rear end of link 240. Reference is now made to Fig. 3 where the link 240 is shown to have its fore end pivotally connected to the pitch action walking beam 242 which is pivotally mounted upon the shaft 244, the right end of which is rigidly held by the arm 246. To the lower end of the pitch action walking beam 242 is pivotally connected the link 248, the rear end of which is pivotally connected to the operating arm 250 of the air speed valve designated generally by 252.

By virtue of the just explained arrangement, it will be clear that the link 240 is always positioned according to the angular position of shaft 140 which, as explained, is a measure of the instant assumed manifold pressure or engine power output. An increase in assumed manifold pressure moves link 240 to the rear while a decrease moves it ahead.

Parenthetically, in Figs. 3 and 4 it will be seen that the gear 138a drives gear 138b which is affixed upon the input shaft of the Selsyn-type transmitter 138c which is connected by electrical cable 138d to a Selsyn-type receiver 138e forming a part of the simulated manifold pressure indicator 138f mounted upon the instrument panel 48 in Fig. 1. As is well known to the prior art, indicator 138f comprises a needle 138g mounted upon the output shaft of the Selsyn-type receiver 138e and arranged to move over a dial 138h graduated in terms of manifold pressure to indicate the assumed manifold pressure. As will be understood by those skilled in the art, the output shaft of the receiver always positions the needle in accordance with the position of the input shaft of the transmitter which in turn is positioned by gear 138a. Inasmuch as gear 138a is always positioned by motor 142 which positions shaft 140 according to the assumed manifold pressure, it is clear that the indicator 138e always indicates to the student the instant assumed manifold pressure.

*Means for combining the factor of assumed engine power with the pitch attitude of the fuselage to produce assumed air speed*

Means will now be described for introducing the factor of climbing and diving movements (pitching) of the fuselage and combining this factor with the assumed engine power to produce assumed air speed.

Means for introducing the factor of climbing and diving of the fuselage 12 are shown in detail in Fig. 2, to which reference is now made. In Fig. 2 the fuselage floor is designated 12a and it will be recalled that this floor rests upon the plate 260 which is attached to the upper yoke 262 of the universal joint 14. The gimbal ring of universal joint 14 is designated 264, this gimbal ring being free to rock about the axis of pins 266, pedestal 20 holding ring 264. Yoke 262 is free to rock about an axis through ring 264 at right angles to the axis 266. The axes of pins 266 extend transversely of the fuselage 12 and are the axes about which the fuselage moves whenever its climbing or diving attitude is changed. Affixed to the yoke 262 is the rearwardly extending rod 268 upon which is movably mounted the carriage 270 which is provided with rollers 272 for easy movement therealong. The link 274 is pivotally connected to the pedestal 20, as shown, and the upper end of this link is pivotally connected to the carriage 270.

The upper end of carriage 270 is slotted as shown, and within this slot is the stud 276 which is affixed to the pitch action sector 278. The upper end of sector 278 is affixed to the transverse shaft 280 which is rotatably held by suitable brackets affixed to the floor 12a. Whenever the fuselage 12 assumes a diving attitude, it will be appreciated that the rear end of rod 268 is moved upwardly and that the carriage 270 moves toward the head of the fuselage. The lower end of sector 278 is moved ahead and the shaft 280 is rotated clockwise. On the other hand, whenever the fuselage 12 assumes a climbing attitude, the carriage 270 moves to the rear of rod 268 and the shaft 280 is rotated counterclockwise.

Referring now to Fig. 3, it will be seen that fixedly mounted upon the left end of shaft 280 is the arm 246, to which reference has been previously made. When the fuselage 12 assumes a diving attitude, the arm 246 is rotated clockwise as seen in Fig. 3 and the rod 244 carried thereby is moved toward the rear. The pitch action walking beam 242 will be pivoted about the point at which link 240 is attached thereto, and consequently the lower end of beam 242 will move toward the rear of the fuselage. Link 248 moves in the same direction.

On the other hand, should the fuselage 12 assume a climbing attitude, arm 246 will be rotated counterclockwise as seen in Fig. 3. Shaft 244 will be moved ahead and pitch action walking beam 242 will be pivoted about the point at which link 240 is attached thereto. The lower end of walking beam 242 will be moved ahead, as will the link 248.

It will be recalled link 240 moves ahead in response to a decrease in assumed engine power output. Accordingly, link 248 moves to the rear. Increases in assumed engine power reverse the directions of movements of links 240 and 248.

It will therefore be appreciated that the pitch action walking beam 242 differentially combines the two factors of assumed engine power and climbing and diving attitude of the fuselage and that it positions link 248 in accordance with these two factors. In the case of a plane in actual flight an increase in engine power as well as a diving of the plane results in an increase in air speed. Decreases in engine power and climbing of the plane result in lower air speed. It should be noted that whenever an increase in the assumed engine power occurs or when the fuselage 12 is placed in a diving position, the link 248 moves to the rear. Also, when a decrease in the assumed engine power or a climbing attitude of the fuselage 12 occurs, link 248 moves ahead. Consequently, the position of link 248 may be taken as a measure of the assumed air speed. The farther to the rear link 248 is positioned, the higher is the assumed air speed.

Reference is now made to Fig. 7 which is a view of a portion of the air speed system, including the air speed regulating valve assembly designated generally by 252. In Fig. 7 it will be seen that the operating arm 250 is rotatably mounted upon the rod 253 held by the frame 254 which is affxed to the floor 12a of the fuselage. The cam 256 is mounted upon the arm 250 by means of the screws 258. The air speed valve housing is designated 286 and the operating arm is numbered 288. Carried by the lower end of the operating arm 288 is the roller 290, arranged to engage the face of cam 256 under the tension of spring 289 which has one end anchored to stud 289a and its other end to the arm 288. Air speed valve 286 is in its internal construction similar to the valve shown in Fig. 6 except that this valve has no capillary nor bleed hole. The air speed regulating valve includes a port 290a and is connected through line 294 to the step-down bellows 292 which in turn is connected to the source of vacuum 302, as shown in Fig. 3. Line 296 connects the other port 298 of the air speed valve with the bellows 300 of the air speed transmitter 284, also shown in Fig. 3. The needle within the air speed regulating valve 252 is operated by the arm 288 and this needle is positioned between the port 290 which connects with the source of vacum 302 and the seat of the valve which is connected to the other port 298 and line 296 which runs to the bellows 300 of the air speed transmitter assembly. This arrangement, it will be recalled, is similar to that shown in Fig. 6.

Referring back to Fig. 3, it has been explained that the position of link 248 may be taken as a measure of the assumed air speed. As the assumed air speed changes, the link 248 moves ahead or to the rear and the arm 250 of the air speed valve 286 is operated. The rotation of arm 250 results in a movement of cam 256, and the eccentricity of this cam results in a rotation of the operating arm 288 by coaction with roller 290. Thus the valve 286 is opened to an extent directly proportional to the assumed air speed of the trainer, and the farther open this valve becomes the greater will be the vacuum applied to the interior of the bellows 300 of the air speed transmitter 284. A suitable bleed hole 296a is placed in the line 296 which connects the valve 252 with the bellows 300.

The construction and operation of the air speed transmitter 284 is known to the prior art and therefore a short explanation of the same will suffice at this point. For a more detailed explanation, reference is made to Patent 2,465,158 granted in my name on March 22, 1949 for Aviation trainer. It will be seen that this transmitter includes a collapsible-expansible Sylphon bellows 300, and the upper end of this bellows is fixed in a suitable frame member (not shown) which is attached to the interior of the fuselage 12. To the bottom movable end of this bellows is attached a flexible link in the form of string 303 which encircles the shaft 304 and continues downward, the lower end of string 303 being attached to one end of spring 305, the other end of which is attached to the frame of the unit. The shaft 304 forms the input shafts of the two Selsyn-type transmitters 306 and 308. The housings of both transmitters 306 and 308 are mounted in the frame of the unit. The transmitter 308 is connected by the electrical cable 310 to the Selsyn receiver 311 of the simulated air speed indicator 312. The air speed indicator 312 is positioned upon the instrument panel 48 within the fuselage, as shown in Fig. 1. This indicator includes a needle 318 mounted upon the output shaft of receiver 311 to move over the dial 320 which is graduated like the dial of the air speed indicator of a real plane. The other Selsyn-type transmitter 306 is connected by means of the electrical cable 314 to the Selsyn-type receiver 316, for a purpose soon to be described. The output shaft of this receiver is 322.

As is well known in the prior art, a collapsing of the bellows 300 as a result of an increase in the assumed air speed results in a rotation of the shaft 304 which is the input shaft of the transmitter 308. A rotation of this input shaft results in a clockwise movement of the needle 318 of the air speed indicator 312 over its associated dial 320 to visually indicate to the student in the fuselage an increase in the assumed air speed. On the other hand, should the bellows 300 expand as a result of a closing of the air speed regulator valve in response to a decrease in assumed air speed, the spring 305 causes a rotation of the input shaft 304 in the opposite direction. The output shaft of the receiver 311 associated with the instrument 312 will rotate through the same angle and in such a direction that the needle 318 moves counterclockwise to indicate a decrease in assumed air speed.

At the same time, the output shaft 322 of the Selsyn-type receiver 316 is rotated through the same angle as and in a direction dependent upon the direction of rotation of the input shaft 304.

It will therefore be appreciated that the indication given by the simulated air speed indicator 312, and that the position of the output shaft 322 of the Selsyn-type receiver 316 is at all times in accordance with the assumed air speed of the trainer. The assumed air speed is dependent upon the combined factor of climbing or diving position of the fuselage 12, and the assumed engine power output. The assumed engine power output, in turn, depends upon the factor of throttle lever setting. The factors which affect assumed altitude will be later explained.

Reference is now made to Fig. 8 which is a detailed disclosure of the air speed unit of which the Selsyn-type receiver 316 forms a part. In Fig. 8 the output shaft 322 of the receiver 316 is shown, and upon this output shaft is affixed the spur gear 324. The rod 326 is rigidly mounted in the frame of the unit (not shown) which is affixed to the floor of the fuselage. Rotatably mounted upon rod 326 is the gear 328 carrying the contact 330. A pair of split contact segments 332 and 334 are affixed to the insulating disc 336 which, in turn, is affixed to the gear 338 driven by the output shaft 340 of the reversible follow-up motor 342. Gear 338, insulating disc 336 and contact segments 332 and 334 are all mounted for rotation as a unit upon the fixed rod 326. A pair of contacts 343 and 344 are held by the frame of the unit so as to bear against the contact segments 332 and 334. Each of the spring contacts 343 and 344 is connected to the motor 342 through one of the conductors 346 or 348. Contact 330 is grounded to the frame of the unit.

Whenever an increase in the assumed air speed occurs as a result of a change in assumed engine power output or in the pitch attitude of the fuselage, the gear 324 upon the output shaft 322 of the receiver 316 is rotated counterclockwise, and the contact 330 is rotated clockwise. Assuming that previous to the change in the assumed air speed, the contact 330 was in engagement with both of the contact segments 332 and 334, the motor 342 will be energized and its output shaft 340 will be rotated counterclockwise. Gear 338, insulating disc 336 and the contact segments 332 and 334 will be rotated clockwise, motor 342 continuing to run to rotate these elements until both of the contact segments 332 and 334 are again in engagement with the contact 330. At this point, motor 342 will stop. As a result of the clockwise rotation of gear 338, the gear 339 which is affixed upon shaft 341 which in turn is rotatably mounted in brackets held by the floor 12a of fuselage 12 will be rotated counterclockwise.

On the other hand, should a decrease in the assumed air speed occur, the gear 328 will be rotated clockwise as seen in Fig. 8. Contact 330 will be rotated counterclockwise and will then engage only the contact segment 332. Motor 342 will be energized to rotate its output shaft 340 clockwise and the gear 338, insulating disc 336 and contact segments 332 and 334 will all be rotated counterclockwise until the segments 332 and 334 again are in engagement with contact 330. At this instant, motor 342 will stop. The counterclockwise rotation of gear 338 will result in a clockwise rotation of the gear 339.

Consequently, the statement may be made that the gear 339 is rotated counterclockwise in response to an increase in the assumed air speed and that the angle through which this gear is so rotated is proportional to the magnitude of the change in air speed. Also, gear 339 is rotated clockwise in response to a decrease in assumed aid speed and the angle through which it is so rotated is proportional to the magnitude of the change in assumed air speed. Accordingly, the gear 339 is always positioned in rotation from a predetermined initial point according to the instant assumed air speed, so the position of this gear may be taken as a measure of the instant assumed air speed.

Shaft 341 will be rotated with gear 339, as will arm 350 which is affixed upon shaft 341, and to the lower end of which is affixed the forward end of link 352. As seen in Fig. 3, the rear end of link 352 is pivotally attached to the upper end of arm 354, the lower end of which is rotatably mounted upon rod 364. Link 358 has its forward end pivotally attached to the arm 354. It will be appreciated that the link 358 of Fig. 3 is moved to the rear as a result of an increase in assumed air speed, and is moved to the left as a result of a decrease in assumed air speed. Accordingly, the position of this link is at all times dependent upon the factor of assumed air speed.

*Combining the factor of assumed air speed and pitch attitude to produce assumed vertical speed*

It has previously been explained that whenever the fuselage 12 is dived, the sector 278 is rotated clockwise as seen in Fig. 3, resulting in a similar rotation of the shaft 280 and of the arm 246 which is affixed upon the left end of this shaft. As best seen in Fig. 9, the rod 244 is carried by arm 246, the outer end of this rod passing through the fork 245 in the upper end of arm 360, the lower end of which arm is affixed upon the rod 362, the other end of this rod being carried by the lower end of arm 246. It will therefore be appreciated that the arm 360 is always rotated in the same direction and through the same angle as is the arm 246 which is carried by shaft 280. Arm 360 carries the stud 364, upon the outer end of which is pivotally mounted the arm 354. As previously explained, the forward end of link 358 is pivotally connected to arm 354.

Accordingly, when the lower end of arm 246 moves ahead in response to a diving of the fuselage, the lower end of arm 360 moves in the same direction, as does stud 364. The lower end of arm 354 also moves ahead, this arm pivoting about the point at which link 352 is attached thereto. Link 358 also moves ahead. Accordingly, link 358 moves ahead in response to a diving of the fuselage. It has previously been pointed out that this link also moves ahead in response to a decrease in assumed air speed.

On the other hand, it will be understood without a detailed explanation that whenever the trainer fuselage assumes a climbing position, by means of shaft 280 and the apparatus disclosed in Fig. 9, the link 358 will be moved to the rear. Accordingly, link 358 is moved to the rear in response to an increase in assumed air speed. As previously explained, it moves in the same direction in response to a raising of the nose of the fuselage.

It will be appreciated that in real aircraft the vertical speed of the plane depends upon the combined factors of plane attitude and air speed. An increase in air speed and a raising of the nose of the plane results in an algebraic increase in vertical speed, while a decrease in airspeed and a nosing down of the plane results in an algebraic decrease in vertical speed. (As used hereinafter, the term "algebraic increase" means a decrease in rate of descent, changing descent to ascent, changing a vertical speed of zero to ascent, or increasing a rate of ascent. "Algebraic decrease" means a decrease in rate of ascent, changing ascent to descent, changing a vertical speed of zero to descent, or increasing rate of descent.) Inasmuch as link 358 moves ahead in response to a diving of the fuselage and in response to a decrease in assumed air speed, and moves toward the rear in response to a raising of the nose of the fuselage and to an increase in assumed air speed, it will be appreciated that the position of link 358 at any instant may be taken as a measure of the factor of assumed vertical speed. When the factor of assumed vertical speed is algebraically increased, link 358 moves to the rear, and when the factor of assumed vertical speed is algebraically decreased, link 358 moves ahead.

Referring back to Fig. 3, it will be seen that the rear end of link 358 is pivotally attached to the outer end of arm 366 which together with the arm 368 forms a bellcrank arrangement, the bellcrank being pivotally held by the outer end of block 370, which together with the arm 374 forms a second bellcrank pivotally mounted upon the pin 372 which is integral with the bracket 376 which may be affixed to the floor of the fuselage. Integral with bracket 376 is the extension 378 which holds one end of the tension spring 380, the other end of which is held by the outer end of the bellcrank arm 374. The left end of link 382 is pivotally attached to the outer end of the bellcrank arm 368, and the right end of this link is attached to the lever 384 which is pivotally mounted upon the pin 386 carried by the fixed vertical wall 388 which is integral with the base member 390 which may be affixed to the floor of the fuselage. The other end of lever 384 has pivotally connected thereto the left end of link 392, the right end of which is pivotally connected to the rear end of lever 394 which in turn is pivotally mounted upon the pin 396 carried by the central bellows member 398, which member for present purposes may be considered to be stationary. The forward end of lever 394 carries the pin 400, the upper end of which is affixed to the sleeve 402 which encircles link 406. The left end of link 406 carries a fixed stop 408 and the compression spring 410 encircles link 406, the left end of this spring bearing against stop 408 and the other end bearing against the left end of sleeve 402. Link 406 carries a second stop 412 and a second compression spring 414 encircles link 406, the right end of this spring bearing against stop 412 and the left end of the spring bearing against the right end of sleeve 402. As is well known, a sleeve 419 may be placed inside sleeve 402, sleeve 419 being affixed upon link 406.

It will be appreciated that the arrangement just disclosed is a conventional compensating arrangement, the exact purpose of which will later become more apparent.

Referring now to Fig. 10, the link 406 is shown, and it will be seen that its right end is pivotally attached to the rear end of arm 416 which is affixed to the lever 418, lever 418 being pivotally mounted upon the pin 420 which may be suitably affixed to any fixed part of the trainer fuselage. The link 422 has its fore end pivotally attached to the left end of lever 418, the rear end of this link being pivotally attached to the upper arm of bellcrank 424 which may be arranged to pivot about the point 426. The other end of bellcrank 424 is pivotally attached to the yoke 428 by means of pin 430, yoke 428 being affixed upon the upper end of plunger 432 of the dashpot 434.

Pivotally attached to the right end of lever 418 is the link 436, the rear end of which is affixed to the block 438 which is slidably mounted upon the rod 440 which may be fixedly held by a suitable frame member which in turn is attached to the fuselage. A pair of stops 442 and 444 may be affixed upon the rod 440 for a purpose to be later described.

When the link 358 moves to the rear in response to an algebraic increase in the factor of assumed vertical speed, the outer end of arm 366 moves in the same direction and the rear end of arm 368 moves toward the right. The reversing lever 384 is moved, resulting in a movement to the left of link 392, and the response of the reversing lever 394 to this movement of link 392 results in a movement to the right of the pin 400 and sleeve 402. The compensating arrangement will transfer the motion of pin 400 to the link 406, and link 406 will also move toward the right.

Referring to Fig. 10, the movement to the right of link 406 will result in a counterclockwise rotation of lever 418, as seen from above, link 422 moving to the rear and link 436 moving ahead. The dashpot 434 in conjunction with the compensating spring arrangement will delay the movements of link 422. The forward movement of link 436 results in a similar movement of block 438 along rod 440.

On the other hand, whenever link 358 is moved ahead in response to an algebraic decrease in the factor of assumed vertical speed, it will be appreciated that all of the parts shown in Figs. 3 and 10 which have just been described as being responsive thereto will move in the opposite direction from that just explained, and the block 438 in Fig. 10 will move toward the rear. Accordingly, the position of block 438 along rod 440 may be taken as a measure of the factor of instant assumed vertical speed—the farther ahead this block is positioned, the higher algebraically is the factor of assumed vertical speed.

Still referring to Fig. 10, it will be seen that the block 438 has formed integrally therewith the rack 446 having teeth 448 which are aligned with the teeth 448 integral with the under side of block 438. The pinion 450 which is affixed upon the shaft 452 is driven by the teeth 448, and upon the left end of shaft 452 is affixed the disc 454 which carries the pin 456, the axis of which is offset from the axis of shaft 452, as shown. Shaft 452 may be mounted in any suitable manner. The pin 456 engages the slot 458 in the disc 460 which is affixed upon the rotor 462 of the vertical speed Selsyn transmitter 464 which is connected through cable 466 to the Selsyn receiver 468, upon the output shaft of which is mounted the needle 470 which moves over the dial 472 which is graduated to have the appearance of the vertical speed indicator of a real plane. The Selsyn receiver 468, needle 470 and dial 472 form the vertical speed indicator designated generally by 474. The indicator 474 is positioned upon the instrument panel as shown in Fig. 1.

Still referring to Fig. 10, a boss 476 is carried by the Selsyn transmitter 464, and this transmitter may be mounted in any suitable frame member. A hair spring 478 is provided, the outer end of this spring being affixed to the boss 476 and the inner end affixed to rotor 462 so as to constantly bias the rotor 462 and disc 460 in the clockwise direction, in order to eliminate any play between the pin 456 and slot 458.

It will be noted that the axis of shaft 462 is offset from the axis of shaft 452 by a predetermined amount.

In view of the just disclosed arrangement, it will be appreciated that when the rack 446 moves toward the head of the fuselage in response to an algebraic increase in assumed vertical speed, the pinion 450, shaft 452, disc 454, pin 456, disc 460 and rotor 462 will all be rotated counterclockwise. The electrical connection between the Selsyn transmitter 464 and Selsyn receiver 468 may be made such that the needle 470 is rotated clockwise over the face of dial 472 to indicate an algebraically greater assumed vertical speed. On the other hand, when block 438 is moved toward the rear in response to a decrease in assumed vertical speed, the just described parts are moved in the opposite directions, resulting in a counterclockwise movement of needle 470 relative to dial 472, thereby indicating an algebraically lower assumed vertical speed.

It will be appreciated that the dash-pot 434 in Fig. 10 and compensating spring arrangement shown in Fig. 3 will delay the movements of the input link 406 of the altitude unit so the changes in the readings of the vertical speed indicator 474 properly lag changes in the pitch attitude of the fuselage and changes in the operation of the air speed system. Thus, when the trainer fuselage is nosed down so that indicator 474 indicates a rapid rate of descent, when the nose of the fuselage is pulled up into a climbing position the vertical speed indicator may for a predetermined length of time indicate a gradually decreasing rate of descent, and then a gradually increasing rate of ascent.

The opposite would be true in changing the attitude of the fuselage from "nose-up" to "nose-down." Thus, the apparatus closely simulates the operation of a real vertical speed indicator in a plane in actual flight under corresponding flight conditions.

In Fig. 10 it will be appreciated that the shaft 452 which controls the readings of the indicator 474 moves linearly in response to changes in assumed vertical speed—i. e., for any change of a given magnitude in the factor of assumed vertical speed, shaft 452 always rotates through the same angle. Referring to Fig. 11, it will be noted that the dial 472 of the vertical speed indicator 474 is not graduated linearly, but is instead graduated logarithmically. At relatively low assumed vertical speeds, the needle 470 moves through a larger angle for a change of given magnitude in assumed vertical speed than is the case at higher assumed vertical speeds. The same is also true of the needle of a vertical speed indicator in a real plane. Accordingly, referring to Fig. 10, if the shaft 452 were directly coupled to the shaft 462 it will be appreciated that the two shafts would move linearly with respect to one another, and that the needle 470 would always move through a given angle for a given magnitude of change in assumed vertical speed, regardless of whether the change occurred at a relatively high or relatively low assumed vertical speed. Obviously, the indicator 474 would not indicate correct assumed vertical speeds.

In order to avoid such incorrect indications, the rotor 462 of transmitter 464 is axially displaced from the shaft 452, and the coupling including disc 454, pin 456 and disc 460 having slot 458 is employed. The apparatus shown in Fig. 10 may be initially adjusted so that when assumed vertical speed is zero, the slot 458 is in a horizontal position. The pin 456 will then be relatively close to the axis of rotor 462. The indicator 474 may then be arranged to indicate an assumed vertical speed of zero. Thereafter, when shaft 452 begins to rotate as a result of a change from an assumed vertical speed of zero, at first the rotation of pin 456 acting upon the disc 460 will result in a larger angular movement of the rotor 462 than the angular movement of shaft 452. Accordingly, needle 470 moves across the dial 472 in Fig. 11 through a larger angle than shaft 452 is rotated. However as shaft 452 continues to rotate, the angular rotation of shaft 462 becomes gradually less in response to any given angular movement of shaft 452, until the angular movement of shaft 462 in response to the angular movement of shaft 452 becomes actually less than the angular movement of shaft 452. Accordingly, even though the movement of shaft 452 is linear in proportion to changes in assumed vertical speed, the angular movement of needle 470 is logarithmic in relation to the movement of shaft 452, and the correct assumed vertical speed may be obtained by reference to the indicator 474.

*Means for integrating assumed vertical speed and time to produce assumed altitude*

Referring again to Fig. 10, it will be seen that a constant speed motor 480 is provided to drive, by means of the reduction gear train contained in housing 482, the shaft 484 upon the outer end of which is affixed the hub 486 integral with the disc 488 upon the face of which is affixed the rubber disc 490. Set screw 492 may be employed to affix hub 486 upon shaft 484. The motor 480 may be carried by housing 482 which in turn is affixed to the casting 496 by means of screws 494. Casting 496 is pivotally held by a pair of pins 498 (only one shown) which in turn are held by the brackets 500 which may be fixedly carried by a suitable frame member. The member 496 carries a pair of pins 502 upon each of which is rotatably mounted a roller 504. A pair of springs 506 have their left ends attached to the pivotally mounted casting 496 at points above the axes of pins 498, and the other end of each of the springs 506 may be suitably attached to any fixed member.

A splined shaft 508 is provided, and this shaft may be mounted for rotation in any suitable manner. Upon this shaft is positioned the interiorly splined driven wheel 510, preferably made of brass, to which is affixed the grooved hub 512. A yoke 514 integral with block 438 fits in the groove of hub 512, and it will be appreciated that reciprocation of block 438 in response to changes in assumed vertical speed will result in a movement of hub 512 and wheel 510 along the splined shaft 508. It will also be appreciated that the springs 506 exert a force upon the casting 496 and rollers 504 which in turn thrusts the rubber driving disc 490 against the driven wheel 510 to prevent slippage between the rubber driving disc 490 and the driven wheel 510.

A conventional type differential designated generally by 516 is provided, this differential including the frame 518, the primary input gear 520, the output gear 522, and the two idler gears 524. The secondary input is in the form of the spur gear 526 which is affixed upon the frame 518. The rear end of spline 508 has affixed upon its rearmost end the primary input gear 520. Gear 526 and frame 518 are free to rotate relative to the said end of spline 508. The output gear 522 of differential 516 is affixed upon the forward end of rotor 528 of the Selsyn-type altitude transmitter 530. Transmitter 530 is connected through the electrical cable 532 with the Selsyn receiver 534, the output shaft of which controls the position of the needles 536 which move over the dial 538 which is graduated like the altimeter of a real plane. Receiver 534, needles 536 and dial 538 form the altimeter designated generally by 540. This altimeter is located upon the instrument panel 48, as shown in Fig. 1.

Affixed upon shaft 528 is the bevel gear 542 which drives the bevel gear 544 and the other gears 546, 548, 550, and 552 of the reduction gear train designated generally by 554. Gear 552 is affixed upon shaft 556, upon the right end of which is affixed the arm 558, to the upper end of which is pivotally attached the rear end of link 560, the forward end of which is attached to the upper end of the previously mentioned arm 196, shown in Fig. 3.

In Fig. 10, a second constant speed motor 562 is provided, and this motor through the reduction gear train contained in housing 564 drives the output shaft 566 upon which is affixed the spur gear 568 which in turn drives the gear 526 which forms the secondary input of differential 516.

Also upon the shaft 556 are affixed the two cams 570 and 572 which respectively engage, under conditions to be later more fully described, the rollers 574 and 576 respectively carried by the movable contacts 578 and 580 of the microswitches 582 and 584 which may be suitably fixed in position.

In adjusting the previously described apparatus for operation, the block 438 and yoke 514 may be adjusted so that when assumed vertical speed is zero the driven wheel 510 bears against disc 490 half-way between the center of disc 490 and the rear edge of this disc, as shown in Fig. 10. As previously explained, under this assumed condition the slot 458 in disc 450 is in the horizontal position, also as shown.

The apparatus shown in Fig. 70 may be designed so that the motor 480 drives the disc 490 at a constant rate in the counterclockwise direction as seen from the left. The motor 562 may drive the gear 568 clockwise as seen from the front at a constant speed. In adjusting the apparatus under the condition of an assumed vertical speed of zero, the block 438, yoke 514 and driven wheel 510 are positioned so that the wheel 510 is driven counterclockwise as seen from the front at the exact rate necessary to cancel the input of differential 516 resulting from the rotation of gear 568 and the counterclockwise rotation of gear 526 and frame 518 of differential 516. Accordingly, the output shaft 528 of differential 516 which also forms the rotor of transmitter 530 remains stationary under the condition of an assumed vertical speed of zero, and the assumed altitude indicated by indicator 540 remains constant. At the same time, the vertical speed indicator 474 is adjusted to indicate an assumed vertical speed of zero. Thereafter, when the previously described controlling factors result in an algebraic increase in assumed vertical speed, the link 436 and block 438 move ahead, resulting in a movement of the driven wheel 510 toward the center of the rubber driving disc 490. The speed of rotation of wheel 510 will decrease, as will the rotation of spline 508, but inasmuch as the secondary input of differential 516 remains constant the output shaft 528 will be rotated counterclockwise at a rate dependent upon the magnitude of the assumed positive vertical speed. At the same time, as previously explained, the shaft 452 will be rotated so that the vertical speed indicator 474 will indicate the correct assumed vertical speed.

On the other hand, should the link 436 and block 438 move to the rear in response to an algebraic decrease in the factor of assumed vertical speed, the driven wheel 510 will be moved toward the periphery of the driving disc 490, and the rate of rotation of this wheel as well as that of the spline 508 will be increased. The primary input of differential 516 will therefore exceed the constant secondary input, and the output shaft 528 which also forms the rotor of transmitter 530 will be rotated clockwise as seen from ahead. The altimeter 534 will have its indication changed to indicate a lower altitude, and the vertical speed indicator 474 will indicate an algebraically decreased assumed vertical speed.

It will be appreciated that the direction of turning of the output shaft 528 depends upon whether the assumed vertical speed is positive or negative, and that the rate of turning of the shaft depends upon the instant assumed magnitude of the vertical speed. The duration of any given direction and speed of rotation of shaft 528 prevails as long as the assumed vertical speed remains constant, and no longer. Accordingly, the apparatus of Fig. 10 integrates assumed vertical speed with time, and the angular position of shaft 528 from the predetermined zero altitude position at any instant is a proper measure of the assumed altitude of the trainer.

In Fig. 10 the stop 442 is provided so that the block 438 which positions the driven wheel 510 cannot move ahead sufficiently far to move the driven wheel 510 ahead of the center of driving disc 490. At the same time, stop 444 is provided so that the driven wheel 510 cannot be moved beyond the periphery of the driving disc.

Reference is now made to Fig. 12 which is a wiring diagram showing the electrical circuits of the motors 480 and 562, as well as the relationship of the micro-switches 582 and 584 to these motors. In Fig. 12 the conductor 600 is connected to one side of the 110 volt source, and this conductor is directly connected to the field coil of motor 480 and is connected to the field coil of motor 562 through the conductor 602. The other side of the coil of motor 480 is connected through the microswitch 582 and conductor 604 with the switch 606, the rotor of which is designated 606a and is connected through conductor 608 to the other side of the 110 volt source through the trainer ignition switch 609. The other side of the coil of motor 562 is connected through the micro-switch 584 and conductor 610 to one side of switch 612, the rotor of which is designated 612a and is connected by means of conductors 614 and 608 and switch 609 to the other side of the 110 volt source. The switches 606 and 612 in reality are a two-gang switch having three terminals "up," "off" and "down." A single manual control 616 controls both of the rotors 606a and 612a. In normal operation the manual control 616 is in its neutral position so that the rotors 606a and 612a engage the "off" terminals of the switches. With the manual control 616 so positioned, and assuming that the trainer is in normal operation, when the shaft 528 which forms the rotor of the altitude transmitter 530 reaches such a position that the altimeter 540 indicates an assumed altitude of 20,000 feet, or any other selected altitude, the cam 572 affixed upon shaft 556 which is controlled by the shaft 528 engages the roller 576 upon the movable arm 580 of the micro-switch 584, causing this micro-switch to open. Referring to Fig. 12, it will be seen that the opening of the micro-switch 584 will result in a de-energization of motor 562. However, motor 480 will continue to run. Referring to Fig. 10, the stopping of motor 562 will suspend the operation of the secondary input of differential 516, but the continuing rotation of the constant speed disc 490 and of the driven wheel 510 will result in a clockwise rotation of shaft 528, as seen from ahead, in which direction shaft 528 rotates to decrease assumed altitude. The altimeter 534 will begin to rotate to indicate a lower assumed altitude, and through the gear train 554 the shaft 556 will be rotated clockwise, closing the micro-switch 580, again rendering motor 562 operable. As soon as the assumed altitude again reaches 20,000 feet—which may be in a few seconds, depending upon the assumed vertical speed—the process will be repeated upon the opening of switch 584 by cam 572. It will therefore be appreciated that the cam 572 and micro-switch 584 limit the assumed altitude at which the trainer may be flown, thus simulating the reaching of the ceiling of an aircraft, and also limiting the angular movement of shaft 556 so that the link 560 will not be moved sufficiently far to damage the valve 184 in Fig. 3.

During the use of the trainer for the instruction of students in the art of instrument flight, as the assumed altitude approaches and reaches zero, the shaft 556 is positioned so that the cam 570 carried thereby engages the roller 574 carried by the movable contact 578, thereby opening the limit switch 582. Referring to Fig. 12, when the limit switch 582 is opened it will be appreciated that the motor 480 is de-energized, but the motor 562 continues to run. The primary input of differential 516 in Fig. 10 will be suspended, and the running of motor 562 will result in a counterclockwise rotation of shaft 528 as seen from ahead—the same direction in which it is reached to increase assumed altitude. The altimeter 534 will show an increase in altitude, but almost immediately the shaft 556 will be rotated counterclockwise to disengage cam 570 from roller 574, and switch 582 will be closed, re-energizing the motor 480. As soon as assumed altitude again reaches zero—which may be in a few seconds, depending upon assumed vertical speed—the process will be repeated. Accordingly, it is impossible for the altimeter 540 to indicate an assumed altitue of below zero.

If for any reason during adjustment or testing of the apparatus it is desired to go quickly from a relatively low to a relatively high assumed altitude, the manual control 616 of Fig. 12 is placed in the "up" position, and it will be seen in Fig. 12 that such a positioning of control 616 will result in a de-energization of the disc drive motor 480. Accordingly, motor 562 is the only motor operating into the differential 516, and the altimeter 534 may be made to show a high altitude in a relatively short length of time. At the same time, shaft 556 and the link 560 controlled thereby will be rapidly rotated into a high assumed altitude position.

On the other hand, with the apparatus positioned in a relatively high assumed altitude position, when it is desired to quickly position the apparatus in a relatively low assumed altitude position, the manual control 616 is placed in the "down" position, and it will be noted in Fig. 12 that such a positioning of control 616 disconnects the differential drive motor 562 from the 110 volt source. Accordingly, only the primary of differential 516 is operated, and the rotor 528 of the altitude transmitter 530 is rotated clockwise as seen from the front, and the altimeter 534 indicates a rapid loss of altitude. Shaft 556, of course, assumes a correspondingly low altitude position.

In view of the preceding explanation, it will be appreciated that the link 560 shown in Figs. 3 and 10 is always positioned fore and aft of the trainer fuselage according to the instant assumed altitude, the higher the assumed altitude, the farther ahead the link 560 will be placed. It will be recalled that the farther ahead link 560 is placed the greater will valve 184 be opened, and consequently the greater will be the vacuum applied to the Sylphon bellows 222 of Fig. 3. As previously explained, an application of increased vacuum to this bellows results in a greater collapsing thereof, and by means of the amplifier designated generally by 118, the assumed manifold pressure indication will be decreased, and the link 240 is moved ahead. Such a movement of link 240 affects the airspeed system, as previously described, and results in a lower indicated assumed airspeed. At the same time, the lower assumed airspeed results in a movement ahead of the link 358, which link is positioned according to the instant assumed vertical speed—this link being moved ahead in response to a lower assumed vertical speed. The input of the altitude and vertical speed unit shown in Fig. 10 will therefore be affected, as previously described, in response to the decrease in assumed airspeed, to indicate an algebraically lower assumed vertical speed, and altitude will be properly affected. On the other hand, should the link 560 move in the opposite direction in response to a decrease in assumed altitude, the same apparatus will respond except its direction of movement will be reversed, and higher assumed manifold pressure and air speed indications will result, as will an algebraically higher assumed vertical speed. The altitude indication will respond properly to the change in assumed vertical speed.

Accordingly changes in assumed altitude affect the assumed manifold pressure indication, assumed air speed indication, as well as the assumed vertical speed and assumed altitude indications.

In view of the preceding disclosure it will be appreciated that this invention discloses a completely new form of altitude system for use in grounded aviation trainers, and that this new apparatus has many important advantages over the previously used pneumatic system. It is possible to achieve as high an assumed altitude as is desired, and a very sensitive system is produced, especially near the zero vertical speed position. This is achieved by reason of the fact that the spline 508 and gear 526 always rotate in the same direction, thereby eliminating backlash in going from a positive to a negative assumed vertical speed. It is not necessary to graduate each vertical speed indicator and altimeter separately because the responses of the mechanical apparatus to the governing mechanical movements may be accurately predicted in the designing of the apparatus.

It is also possible, with the apparatus of this invention, to obtain an assumed altitude of any desired amount.

It should be particularly noted that many of the advantages of this invention may be achieved by the use of a single motor which may drive both the constant speed disc and the secondary differential input in Fig. 10. Two motors are necessary only to achieve the previously described advantages of quickly changing from a high assumed altitude to a low assumed altitude, or vice versa.

*Rough air mechanism*

Figure 13:
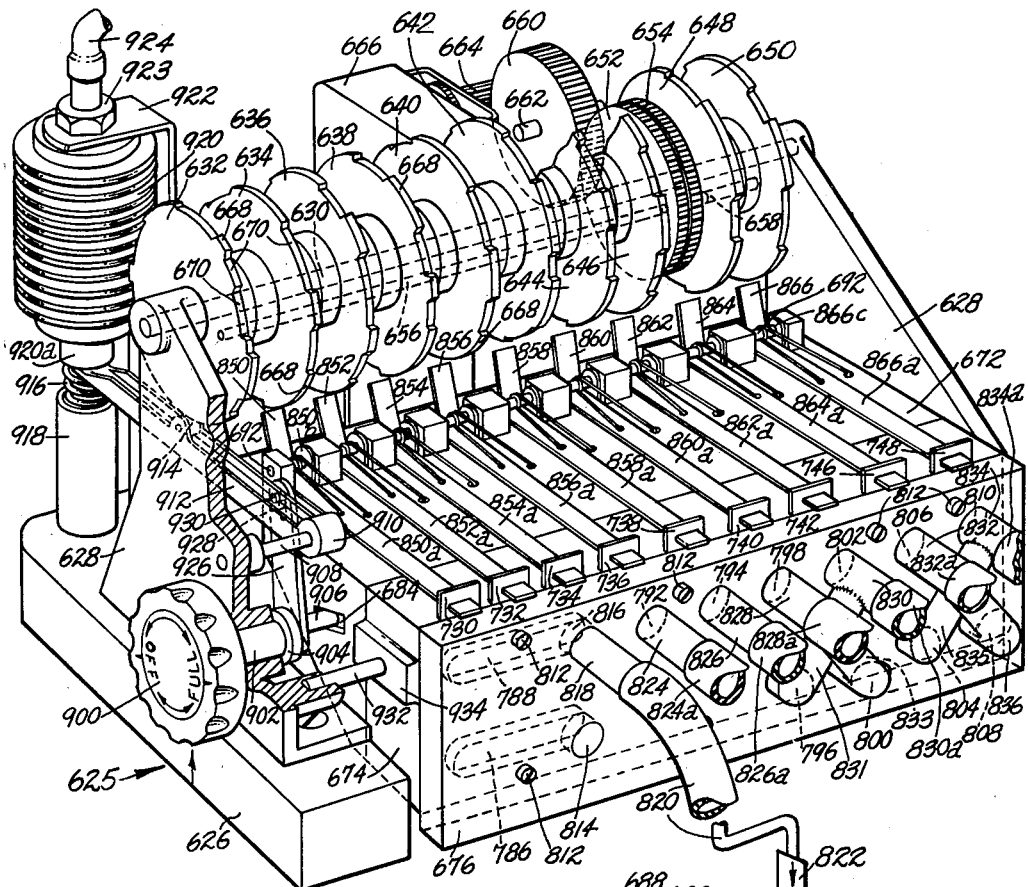
Fig. 13 is a general perspective view of the rough air apparatus which may be combined with my invention.

Reference is now made to Fig. 1 where the general positioning of the rough air mechanism of this apparatus is shown, the apparatus being designated generally by 625. In Fig. 13 it will be seen that the same unit is shown in perspective form, and is designated by the same reference character. This unit includes a base 626 which may be suitably affixed within the fuselage 12. A pair of upright brackets 628 are in turn affixed to the base 626. These two brackets hold a rod 630 upon which are rotatably mounted a plurality of cams designated 632, 634, 636, 638, 640, 642, 644, 646, 648 and 650. Also a pair of gears 652 and 654 are freely mounted upon the rod 630. The gear 652 has a predetermined number of teeth, e. g., 79, while the gear 654 has a slightly different predetermined number of teeth, e. g., 80. Gear 652 and the cams 632, 634, 636, 638, 640, 642, 644 and 646 are pinned together by the pin 656 in order that they will rotate as a unit upon the rod 630. At the same time, the gear 654 and the two cams 648 and 650 are pinned together by pin 658 in order that they will rotate as a unit relative to the rod 630. A gear 660 may be rotatably mounted upon the rod 662 which is held in any desired manner, this gear being driven by the pinion 664 which in turn is driven by the synchronous motor 666. Motor 666 may be energized and de-energized by the main ignition switch in the trainer, which switch, being well known, is not disclosed at this point. It will therefore be appreciated that upon closing of the ignition switch the two gears 652 and 654 and the cams pinned thereto rotate about the rod 630, gear 652 and the cams pinned thereto rotating at a slightly greater rate than the gear 654 and the cams pinned to that gear. The apparatus may be designed to rotate the cams at a slow rate, e. g., one R. P. M.

It will be noted that each of the cams has a plurality of alternating peripheral projections 668 and depressions 670, and that insofar as the cam 632 is concerned, some of its depressions 670 are deeper than others. The purpose of the projections and depressions of these cams will be later described.

Figure 14:
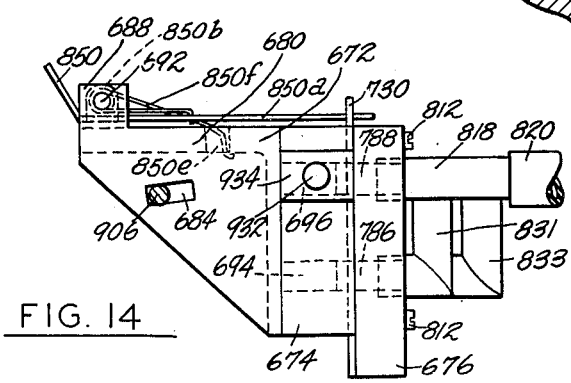
Figures 15, 16, 17, 18:
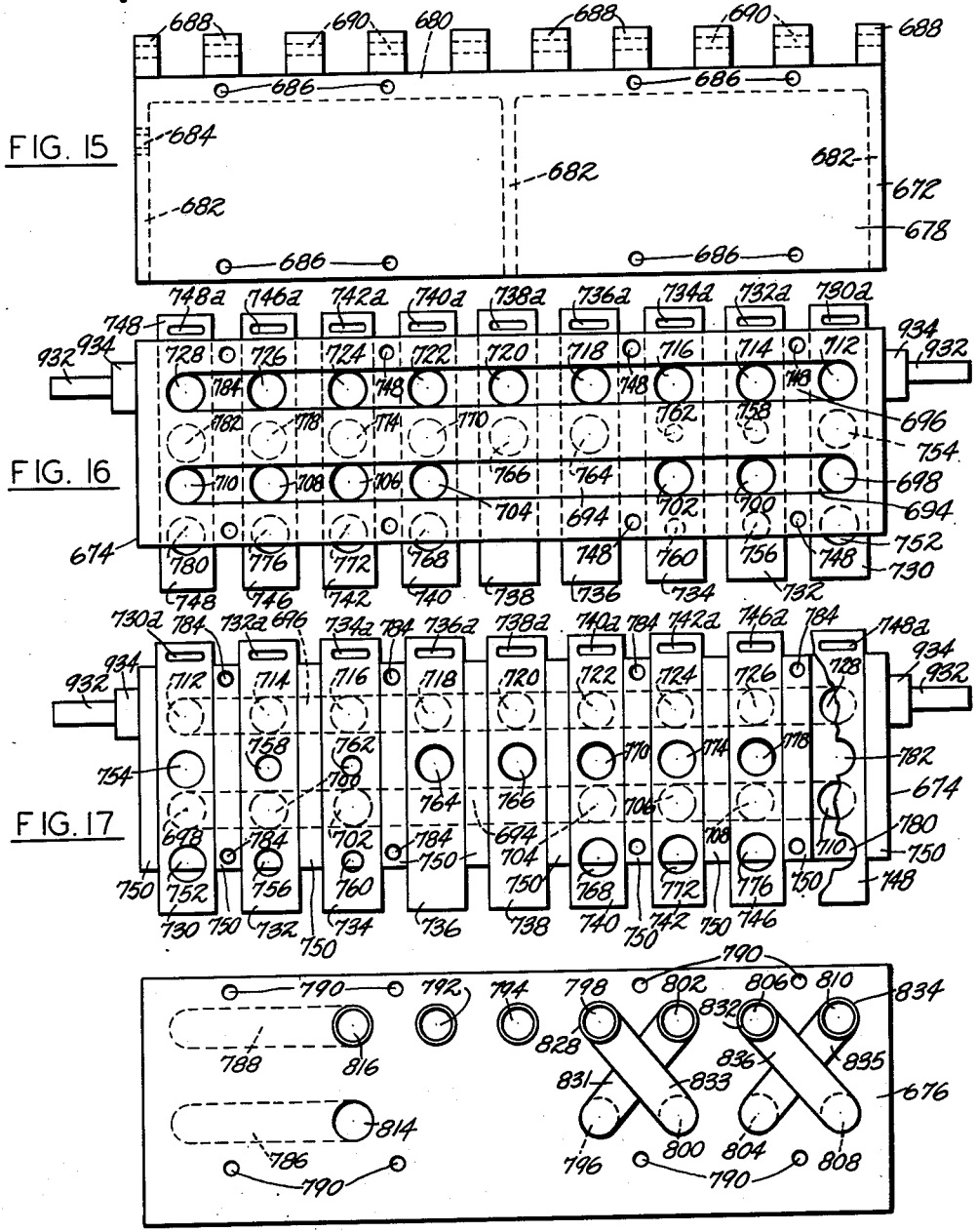

The rough air unit designated generally by 625 includes a main manifold which in turn includes a back member 672, a middle member 674 and a front member 676. Fig. 14 is an end view of these three members showing them in their relative positions. The rear member 672 includes a vertically disposed member 678, the face of which as seen in Fig. 15 is perfectly flat, except for the screw holes 686 therein. Integral with member 678 is the horizontally disposed support 680, and three vertical strengthening members 682 are integrally formed with members 678 and 680. A slot 684 is placed in the left-most member 682. Integrally formed with the rear edge of the horizontal member 680 are a plurality of bosses 688, each of which is drilled at 690 for the reception of rod 692.

Reference is now made to Figs. 16 and 17 which are rear and front views of the intermediate manifold member 674. In Fig. 16 which is a view of the rear side of member 674, it will be seen that the rear side is perfectly flat except for the two horizontal channels 694 and 696 placed therein. These channels do not extend completely through member 674. A plurality of ports 698, 700, 702, 704, 706, 708, and 710 pass through the front face of member 674 and communicate with lower channel 694. At the same time, a plurality of ports 712, 714, 716, 718, 720, 722, 724, 726, and 728 pass through the front face of member 674 and communicate with the upper channel 696 in the rear side thereof. In Fig. 17 it will be seen that the front face of member 674 has a plurality of vertical recessions therein, equal in depth to the thickness of the slide valves 730, 732, 734, 736, 738, 740, 742, 746 and 748, so that the front surfaces of the slide valves and the intermediate portions of the front face of the member 674 form a continuous flat surface except for the ports in the slide valves.

It will be noted that the slide valve 730 has two ports 752 and 754 passing therethrough; the slide valve 732 has two ports 756 and 758 passing therethrough; and the slide valve 734 has two ports 760 and 762 passing therethrough. The ports in valve 732 are intermediate in size with respect to the ports in valves 730 and 734.

The valve 736 has a single port 764, and valve 738 has a single port 766. The valve 740 has two ports 768 and 770; valve 742 has two ports 772 and 774; valve 746 has two ports 776 and 778; and valve 748 has two ports 780 and 782. All of the ports in all of the valves pass completely through the valves, and when the valves are in their downmost position as shown in Fig. 17, the ports therein are arranged with respect to the ports in the member 674 as shown.

A plurality of screw holes 784 pass through the member 674 and are aligned with the screw holes 686 in the rear member 672.

The rear face of the front member 676 is perfectly flat except for the two channels 786 and 788 therein, the screw holes 790 passing therethrough, and the ports 792, 794, 796, 798, 800, 802, 804, 806, 808, and 810 passing therethrough. When the screws 812, seen in Fig. 14, hold the three members 672, 674, and 676 in assembled position, the channel 786 in the rear face of the front member 676 lies opposite the three ports 702, 700, and 698 in the center member 674; the channel 788 lies opposite the ports 712, 714 and 716 in member 674; port 792 lies opposite port 718 and port 794 lies opposite port 720 in member 674; ports 796, 798, 800 and 802 respectively lie opposite the ports 704, 722, 706, and 724 in member 674; and ports 804, 806, 808 and 810 are respectively opposite ports 708, 726, 710 and 728 in member 674. However, when the slide valves are positioned as shown in Fig. 17, it will be appreciated that none of the ports nor the counterbores in member 676 are in communication with any of the ports in the intermediate member 674.

In Fig. 18 it will be seen that the port 814 passes through the front face of member 676 and communicates with the channel 786, while the port 816 similarly passes through the front face of member 676 and communicates with channel 788. Referring to Fig. 13 it will be seen that the port 814 opens into the atmosphere, and it will therefore be appreciated that the channel 786 is at all times at atmospheric pressure. A coupling 818 is inserted in the port 816, and a suitable pneumatic line 820 has one end connected to coupling 818 and its other end to a suitable source of vacuum 822. Accordingly, channel 788 is at all times at a predetermined reduced pressure potential.

In Fig. 13 it will be seen that a coupling 824 is inserted in the port 792, and hose 824a is connected to coupling 824, the other end of hose 824a being shown in Fig. 3 connected to the coupling 825 carried by the fixed vertical member 388. A bleed hole 824b is placed in line 824a. The member 388, movable member 398 and cloth covering 86 form an air-tight bellows designated generally by 80. A couping 826, as seen in Fig. 13, is placed in port 794 and one end of pneumatic line 826a connects to the outer end of this coupling. In Fig. 3 it will be seen that the other end of pneumatic line 826a is connected to the coupling 827 which is carried by the fixed vertical member 388a. Bleed hole 826b is placed in line 826a. The member 388a, movable member 398 and cloth covering 88 form a second air-tight bellows designated generally by 82. In Fig. 13 coupling 828 is shown in communication with port 798, and one end of pneumatic line 828a is connected to coupling 828. In Fig. 1 it will be seen that the other end of pneumatic line 828a is connected to the left banking bellows 34. In Fig. 13 it will be seen that the coupling 830 is in communication with port 802, and that one end of pneumatic line 830a is connected to coupling 830. In Fig. 1 it will be seen that the other end of pneumatic line 830a is connected to the right banking bellows 36.

Also in Fig. 13 it will be seen that the port 796 is connected through the coupling 831 with the coupling 830, and that port 800 is connected through coupling 833 with the coupling 828. Coupling 832 has one end inserted in port 806, and the other end of this coupling is connected by pneumatic line 832a with the forward pitching bellows 30, as shown in Fig. 1. At the same time, coupling 834 is inserted in port 810, and pneumatic line 834a connects this coupling with the rear pitching bellows 32, also as seen in Fig. 1. In Fig. 13 it will be seen that connector 835 connects port 804 with coupling 834, and that coupling 836 connects port 808 with the coupling 832.

Figure 19:
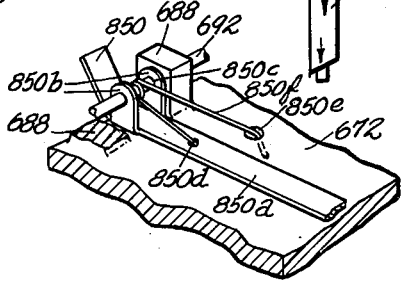
Figs. 14, 15, 16, 17, 18 and 19 are views of different parts of the apparatus shown in Fig. 13.

In Fig. 14 it will be seen that there are provided a plurality of rockers designated by the numbers 850, 852, 854, 856, 858, 860, 862, 864, and 866, each of these rockers extending substantially vertically, but slightly inclined to the rear. Integral with each of the just mentioned rockers is the long extension bearing the same numbers with the suffix "a" added. The rocker 850 together with its integral extension 850a, is shown in Fig 19, and it will be seen that this rocker has a pair of upstanding lugs 850b in each of which is drilled a hole 850c for the reception of the pivot rod 692. Each of the rockers is identical in construction. In Fig. 13 it will be seen that the foremost end of the extension of each of the rockers passes through the rectangular slot in the uppermost end of each of the nine vertical slide valves. Each of the nine rockers is disposed in vertical alignment below a different one of the nine cams shown in Fig. 13 to the right of cam 632. As seen in Fig. 19, a hole 850d is drilled in the horizontal extension 850a of rocker 850, and a corresponding hole 850e is drilled in the top of the rear manifold member 672. A hairspring 850f is provided, one end of this spring being inserted through the hole 850d, the spring encircling rod 692, and the other end of this spring being inserted through the hole 850e. It will be appreciated that the hairspring 850f will return the extension 850a of rocker 850 to the position shown in Fig. 13. Each of the rockers and rocker extensions has a similar spring arrangement to that shown in Fig. 19.

Referring again to Fig. 13, it will be seen that the rough air control knob is designated 900 and is affixed upon the outer end of the shaft 902 which is rotatably supported by the left bracket 628. A collar 904 is integral with the inner end of shaft 902, and an eccentric pin 906 having its axis displaced from the axis of shaft 902 is integrally formed with collar 904. Pin 906 passes through the slot 684 in the left end of manifold member 672. The rod 908 is fixedly carried by left bracket 628, and upon the right end of this rod is rotatably mounted the hub 910 which is affixed to the front end of the arm 912 which carries the roller 914, the other end of arm 912 engaging the top of the compression spring 916 which in turn is supported by the member 918 which is attached to base 626. The rear end of arm 912 may be affixed to the lower end 920a of the collapsible-expansible metallic bellows 920 which is supported by means of bracket 922 and nut 923. A pneumatic line 924 connects the bellows 920 with the pneumatic line 296 of the airspeed system, as shown in Fig. 3. Except for the connection with pneumatic line 924, bellows 920 is air-tight.

Referring back to Fig. 13, the arm 926 has its lower end movably mounted upon the eccentric pin 906, and the upper end of this arm has a vertical slot 928. A pin 930 is carried by the arm 912 and is positioned in slot 928. A pair of pins 932 (only one shown) are provided, each of these pins being fixedly mounted in axial alignment in a different one of the brackets 628, and each of these pins enters a block 934 (only one shown), each of which blocks is attached to opposite ends of the middle manifold member 674. The manifold members 672, 674 and 676 are free to pivot about the axes of pins 932 in a manner which will be later described.

Considering now the operation of the rough air apparatus, when the rough air control handle 900 is positioned as shown in Fig. 13, the manifold members and the rocker arms 850–866 are positioned so that when the cams are rotated their peripheries do not engage the vertically extending rockers. Accordingly, the entire apparatus is rendered inoperative.

However, assuming that the control handle 900 is rotated clockwise a predetermined distance, it will be appreciated that the upper ends of the rocker arms will engage the periphery of the cams mounted upon rod 630. The rotation of the cams will result in irregular back and forth movement of the rockers, and corresponding up and down movements of the rocker extensions, and the slide valves will be irregularly moved upwardly and downwardly in accordance with the peripheral pattern of the cams, the return movements being under the force of the hairsprings.

Referring to Figs. 15, 16, 17, and 18, and bearing in mind that the various slide valves are assumed to be moving upwardly and downwardly in an irregular pattern under the control of the cams and springs, it will be appreciated that atmospheric pressure is present at all times in the channel 786 while vacuum or reduced pressure is similarly present at all times in the channel 788. Whenever either of the slide valves 730, 732, or 734 is moved upwardly so that the port therein engages the port therebehind and communicating with the channels 694 and 696 in the intermediate manifold member 674, it will be appreciated that vacuum will be admitted into the channel 696 and atmosphere into the channel 694. The amount of vacuum and atmosphere entering the two channels 694 or 696 will depend upon which one or more of the slide valves 730, 932, and/or 734 is moved upwardly at any instant, as well as the amount of upward movement of any one or more of these three slide valves. Accordingly, the amount of reduced pressure in channel 696 and the amount of pressure in channel 694 is constantly being varied.

As the rocker 860 and rocker 862 are engaged and disengaged by the periphery of the two cams 644 and 646, the slide valves 740 and 742 will be moved upwardly and downwardly in a pattern dependent upon the peripheral pattern of the two respective control cams. These two cams may be arranged so that when one of the slide valves 740 or 742 is up, the other is nearly always down. Assuming that slide valve 740 is up, it will be appreciated that vacuum will pass through the ports 722, 770, and 798 through the coupling 828 and pneumatic line 828a to the left banking bellows 34 in Fig. 1, and that this bellows will be contracted. At the same time atmosphere will pass through ports 794, 768, and 796 to the coupling 831 which runs to the coupling 830 which in turn is connected by the pneumatic line 830a to the right banking bellows 36, and this bellows will be expanded. Accordingly the contraction of the left banking bellows and the expansion of the right banking bellows will result in a sudden limited banking of the fuselage 12 to the left.

On the other hand, assuming that the slide valve 740 is in the position shown in Fig. 17 and the slide valve 742 is moved upwardly, vacuum will pass from the port 724 through the ports 774 and 802 to the coupling 830 and thence through the pneumatic line 830a to the right banking bellows 36 in Fig. 1. Simultaneously therewith, atmospheric pressure within the lower channel 694 will pass through ports 706, 772, and 800 to the connector 833, and thence to the connector 828 which is connected through the pneumatic line 828a with the left banking bellows 34 in Fig. 1. Accordingly, the right banking bellows is collapsed and the left banking bellows is simultaneously expanded, resulting in a sudden limited banking to the right of the fuselage.

When the rough air control wheel 900 is placed in the "on" position, this intermittent sudden and limited banking of the fuselage 12 to the right and left in accordance with the peripheral pattern of the control cams 644 and 646 continues.

Considering now the effect of the rough air apparatus upon the pitching of fuselage 12, and referring to the same figures, it will be realized that the slide valves 746 and 748 control the rough air effect upon the forward and rear pitching bellows. Whenever slide valve 746 is moved upwardly, it will be appreciated that vacuum will pass from channel 696 through ports 726, 778, 806 and coupling 832 to the pneumatic connection 832a which connects with the forward pitching bellows 30. Accordingly, this bellows will be contracted. Simultaneously, the higher pressure within channel 694 will be discharged through ports 708, 776, 804, and connector 835 to the connector 834 which is connected through pneumatic connection 834a with the rear pitching bellows 32 in Fig. 1. This bellows will therefore be expanded. The collapsing of the front pitching bellows and the expansion of the rear pitching bellows will result in a sudden, limited nosing down of the fuselage 12.

On the other hand, should the slide valve 748 be moved upwardly, the reduced pressure within channel 696 will pass through ports 728, 782, and 810 to the connector 834 which is connected through the pneumatic connection 834a with the rear pitching bellows 32 in Fig. 1. This bellows will be contracted. Simultaneously therewith, the pressure within the channel 694 will be transferred through ports 710, 780 and 808 to the connector 836 which connects with connector 832 which in turn is connected to the forward pitching bellows 30 by means of the pneumatic line 832a. Accordingly the rear pitching bellows will be contracted, the forward pitching bellows will be expanded, and the fuselage 12 will have its nose suddenly raised by a limited amount.

Such pitching of the fuselage 12 will continue as long as the rough air apparatus is kept in operation.

Of course, if both of the valves 746 and 748 are moved upwardly at the same time, the effect upon the attitude of fuselage 12 will be the combined effects of the two valve movements, resulting in at least a partial cancellation.

Considering now the effect of the rough air apparatus upon the indications given by the altimeter and vertical speed indicator, referring to Figs. 13, 15, 16 and 17, it will be seen that the slide valves 736 and 738 are controlled by the cams 640 and 642. Whenever slide valve 736 is raised upwardly so that port 764 engages the port 718, reduced pressure will be transferred from channel 696 through ports 718, 764 and 792, to the coupling 824 which is connected through pneumatic line 824a with the connector 825 in Fig. 3, which connector is carried by the fixed vertical member 388 which forms the fixed side of the left bellows designated generally by 80. Accordingly this bellows will be contracted, and the common central bellows member 398 will quickly move to the left. The pivot member 396 will be moved in the same direction, arm 394 pivoting about the right end of link 392, and the compensating rod and link 396 will all be quickly moved to the left. It will be recalled that such a movement of link 406 results in an algebraic decrease in assumed vertical speed. This decrease will be suddenly reflected by the vertical speed indicator 474 of Fig. 10. The indications of the altimeter 540 will properly be affected.

On the other hand, when the slide valve 738 is moved upwardly so that port 766 engages port 720, the reduced pressure in channel 696 will be transferred through ports 720, 766 and 794 to the connector 826, and then through the pneumatic connection 826a to the bellows connector 827 in Fig. 3. The pressure within bellows 82 will be reduced, and the central bellows member 398 will be moved quickly toward the right. The pivot 396 will move in the same direction, the rear end of lever 394 pivoting upon the right end of link 392, and the compensating mechanism and link 406 will be quickly moved to the right. It will be recalled that such a movement of link 406 results in an indicated algebraically higher assumed vertical speed. Accordingly, the vertical speed indicator 474 of Fig. 11 will respond to indicate a sudden change in assumed vertical speed, and the altimeter 540 will have its indication properly affected.

Of course, if both the slide valves 736 and 738 are moved upwardly at the same time, the indicated assumed vertical speed and assumed altitude will be affected according to the combined effects of the admission of reduced air pressure to both of the bellows 80 and 82 of Fig. 3.

The rough air effect upon the indications of the vertical speed indicator and altimeter will continue as long as the apparatus is continued in operation.

Lastly, considering the effect of the rough air mechanism upon the indications of the air speed indicator, and upon the operation of the air speed system, it will be appreciated that when the control wheel 900 is rotated clockwise to place the apparatus in operative position, the rotation of cam 632 will result in an intermittent raising and lowering of the roller 914 in a pattern corresponding to the peripheral pattern of this cam. Inasmuch as the front end of arm 912 is pivoted upon rod 908, the rear end of this arm will be raised and lowered in the same pattern. The vertical movements of the rear end of arm 912 will result in a collapsing and expanding of the Sylphon bellows 920, and accordingly in a raising and lowering of the pressure in line 924 which is connected to the line 296 seen in Fig. 3. These variations of pressure within line 924 will be transferred to line 296, and the Sylphon bellows 300 will be expanded and contracted. Such movements of the Sylphon bellows 300 will, of course, result in slight intermittent changes in the reading of the air-speed indicator 320, and in the operation of the airspeed follow-up system motor designated generally by 335.

It has been explained that with the control handle 900 positioned as seen in Fig. 13, the control cams clear the top of the rocker arms and the rough air mechanism is rendered inoperative. It will be appreciated that by rotating the control wheel 900 clockwise the eccentric pin 906 acts upon the walls of the slot 684 to rotate the three manifold members 672, 674, and 676 in the same direction as the control 900 is rotated. Accordingly, the upper ends of the rockers may be brought into engagement with the peripheries of the control cams so that the rough air apparatus is rendered operative to function in the previously described manner. It will be appreciated that by selectively rotating the manifold members the magnitude of the motions imparted to the rockers may be controlled within the depths of the depressions in the control cams, so that the magnitude of the effect of the rough air apparatus may be selectively regulated.

It will be appreciated that the three slide valves 730, 732 and 734 control the extent of the reduced pressure in the channel 696 and the extent of the higher pressure admitted to channel 694, thereby controlling the magnitude of the rough air effect at any instant. Inasmuch as the slide valves 730, 732 and 734 are raised and lowered in various sequences, it will be appreciated that the rough air pattern is complicated to a large degree, thereby rendering it impossible for the student to easily memorize the rough air pattern. Also, inasmuch as the two cams 648 and 650 which control the rough air effect upon the pitch apparatus rotate at a different rate from the two cams 644 and 646 which control the rough air effect upon the banking apparatus, it will be appreciated that the rough air pattern is even more complicated, and is, in fact, complicated to such an extent that the same rough air pattern is not repeated for a period of over an hour. This being the case, it is believed apparent that it will be impossible for the student to memorize the rough air pattern. Accordingly, it will not be possible for him to anticipate the rough air movements by applying opposite control effects just before the rough air effects are to occur. Also, inasmuch as the pitch rough air effects are not synchronized with the instrument rough air effects, the cycle of rough air effects on the instruments will not be repeated for a similar length of time.

Accordingly, the rough air effects upon the trainer are as unpredictable to the student as are the rough air effects upon the pilot of a real plane, and actual flying conditions are thereby much more exactly simulated than with prior known apparatus.

The air speed indicator, vertical speed indicator and altimeter are directly responsive to the rough air mechanism, so that it is as difficult for the student in the trainer to maintain a given air speed, vertical speed and/or altitude as in the case of a pilot in a plane in actual flight.

In view of the disclosure of the preferred embodiment of my invention, as set forth herein, it will be appreciated that the objects of my invention as stated in the introduction hereof have been disclosed. Inasmuch as numerous changes may be made from the disclosed embodiment of my invention without departing from the substance thereof, the preceding disclosure should be construed as illustrative and not as a limitation upon the scope of the following claims:

I claim:

1. In a grounded aviation trainer, the combination of a driving member having a face arranged to be rotated at a constant speed, a driven disc having its periphery in engagement with the face of the driving member, a differential having two input members and an output member, a connection between the driven disc and one of the input members of said differential, said connection being reversibly operable dependent upon the relative positions of said driving member and said driven disc, a constant speed motor connected to the other input member of said differential, a first instrument simulating the altimeter of a real plane, a connection between the output of said differential and said first instrument, a control member, a connection between said control member and said driven disc for moving the same relative to the face of said driving member, a second instrument simulating the vertical speed indicator of a real plane, a connection between said control member and said second instrument, and means for moving said control member in response to changes in the assumed vertical speed of said trainer.

2. In a grounded aviation trainer, the combination of a driving member having a face arranged to be driven at a constant speed, a driven disc having its periphery in engagement with the face of the driving member between the center and periphery of the driving member, a differential having two input members and an output member, a connection between the driven disc and one of the input members of said differential, a constant speed motor connected to the other input member of said differential, the input ratios of said differential being such that when said driven disc is positioned at a predetermined point between the center and periphery of said driving member the output member of said differential is stationary, an instrument simulating the altimeter of a real plane, a connection between the output of said differential and said instrument, and means for selectively positioning said driven disc on opposite sides of the said predetermined point on said driving member according to the instant assumed vertical speed of the trainer.

3. In a grounded aviation trainer, the combination of a driving member having a face, a constant speed motor connected to said driving member for rotating the same, a driven disc having its periphery in engagement with the face of the driving disc, means for changing the relative positions between said driven disc and driving member according to the assumed vertical speed of the trainer, a differential having two inputs and an output, a connection between said driven disc and one of the inputs of said differential, a second constant speed motor connected to the other input of said differential, an instrument simulating the altimeter of a real plane, a connection between the output of said differential and said instrument, and selectively operable switching means for energizing either one or both of said motors.

4. In a grounded aviation trainer, the combination of a driving member having a face, a constant speed motor connected to said driving member for rotating the same, a driven disc having its periphery in engagement with the face of the driving disc, means for changing the relative positions between said driven disc and driving member according to the assumed vertical speed of the trainer, a differential having two inputs and an output, a connection between said driven disc and one of the inputs of said differential, a second constant speed motor connected to the other input of said differential, an instrument simulating the altimeter of a real plane, a connection between the output of said differential and said instrument, and switching means operable by the output of said differential when said instrument indicates a predetermined assumed altitude for stopping one of said motors.

KARL A. KAIL.

REFERENCES CITED

The following references are of record in the file of this patent:

UNITED STATES PATENTS

| Number | Name | Date |
|---|---|---|
| 1,032,183 | Buchan | July 9, 1912 |
| 1,920,024 | Shehli | July 25, 1933 |
| 2,099,857 | Link | Nov. 23, 1937 |
| 2,358,018 | Lowkrantz | Sept. 12, 1944 |
| 2,359,866 | Lowkrantz | Oct. 10, 1944 |
| 2,439,168 | Kail | Apr. 6, 1948 |
| 2,442,205 | Kail | May 25, 1948 |
| 2,460,743 | Germanton | Feb. 1, 1949 |
| 2,463,602 | Dehmel | Mar. 8, 1949 |
| 2,465,158 | Kail | Mar. 22, 1949 |

FOREIGN PATENTS

| Number | Country | Date |
|---|---|---|
| 256,614 | Italy | Jan. 7, 1928 |